(12) United States Patent
Seki et al.

(10) Patent No.: US 10,443,811 B2
(45) Date of Patent: Oct. 15, 2019

(54) MICROLENS ARRAY AND OPTICAL SYSTEM INCLUDING THE SAME

(71) Applicant: NALUX CO., LTD., Osaka-shi, Osaka (JP)

(72) Inventors: Daisuke Seki, Osaka (JP); Kayoko Fujimura, Osaka (JP); Masato Okano, Osaka (JP); Yukinobu Nishio, Osaka (JP); Tomohito Kuwagaito, Osaka (JP)

(73) Assignee: NALUX CO., LTD., Osaka-shi, Osaka (JP)

( * ) Notice: Subject to any disclaimer, the term of this patent is extended or adjusted under 35 U.S.C. 154(b) by 380 days.

(21) Appl. No.: 15/359,716

(22) Filed: Nov. 23, 2016

(65) Prior Publication Data

US 2017/0074481 A1 Mar. 16, 2017

Related U.S. Application Data

(63) Continuation-in-part of application No. PCT/JP2015/065136, filed on May 26, 2015.
(Continued)

(51) Int. Cl.
*F21V 5/00* (2018.01)
*G02B 3/00* (2006.01)
(Continued)

(52) U.S. Cl.
CPC ............ *F21V 5/004* (2013.01); *G02B 3/0043* (2013.01); *F21Y 2115/30* (2016.08); *G02B 19/0014* (2013.01); *G02B 27/425* (2013.01)

(58) Field of Classification Search
None
See application file for complete search history.

(56) References Cited

U.S. PATENT DOCUMENTS

2002/0034710 A1* 3/2002 Morris ................ G02B 3/0043
430/321
2004/0130790 A1 7/2004 Sales
(Continued)

FOREIGN PATENT DOCUMENTS

JP 63-221329 A 9/1988
JP 03-192232 A 8/1991
(Continued)

OTHER PUBLICATIONS

International Search Report and Written Opinion dated Aug. 25, 2015 corresponding to International Patent Application No. PCT/JP2015/065136 and English translation thereof.
(Continued)

*Primary Examiner* — William R Alexander
*Assistant Examiner* — Gary W O'Neill
(74) *Attorney, Agent, or Firm* — Squire Patton Boggs (US) LLP

(57) ABSTRACT

A microlens array includes N microlenses arranged in a predetermined direction on an x-y plane. A projection onto the x-y plane of the vertex of each microlens is arranged in the vicinity of a lattice point of a reference lattice on the x-y plane, the lattice spacing of the reference lattice in the predetermined direction being D/M (millimeters) where M is a positive integer. A distance between two sides of a lens facing each other is approximately equal to D, and a distance between the projection onto the x-y plane of the vertex of the lens and the projection onto the x-y plane of a side of the lens is D/2+εi. Letting n represent the refractive index of the material of each microlens and letting f (millimeters) represent the focal length of each microlens, the following relationships are satisfied.

(Continued)

$$\frac{0.0042}{D} < \frac{D}{2f} = \frac{D(n-1)}{2R}$$

$$0.0048\sqrt{f}\,\{1+(D/2f)^2\} < \sigma < 0.014\sqrt{f}\,\{1+(D/2f)^2\}$$

$$\sigma^2 = \sum_{i=1}^{N} \frac{(\varepsilon_i - \bar{\varepsilon})^2}{N}$$

$$\bar{\varepsilon} = \sum_{i=1}^{N} \frac{\varepsilon_i}{N} = 0$$

15 Claims, 20 Drawing Sheets

Related U.S. Application Data

(60) Provisional application No. 62/003,190, filed on May 27, 2014.

(51) Int. Cl.
  *F21Y 115/30* (2016.01)
  *G02B 27/42* (2006.01)
  *G02B 19/00* (2006.01)

(56) References Cited

U.S. PATENT DOCUMENTS

2013/0329299 A1  12/2013  Kim et al.
2015/0103410 A1*  4/2015  Ando ............... G02B 27/0101
                                                359/630

FOREIGN PATENT DOCUMENTS

| | | |
|---|---|---|
| JP | 2006-500621 A | 1/2006 |
| JP | 2014-510952 A | 5/2014 |
| WO | WO 2004/072698 A1 | 8/2004 |
| WO | WO 2013/179649 A1 | 12/2013 |

OTHER PUBLICATIONS

Hakan Urey et al.: "Microlens-array-based exit-pupil expander for full-color displays," Applied Optics, vol. 44, No. 23, Aug. 10, 2005, pp. 4930-4936.

* cited by examiner

100

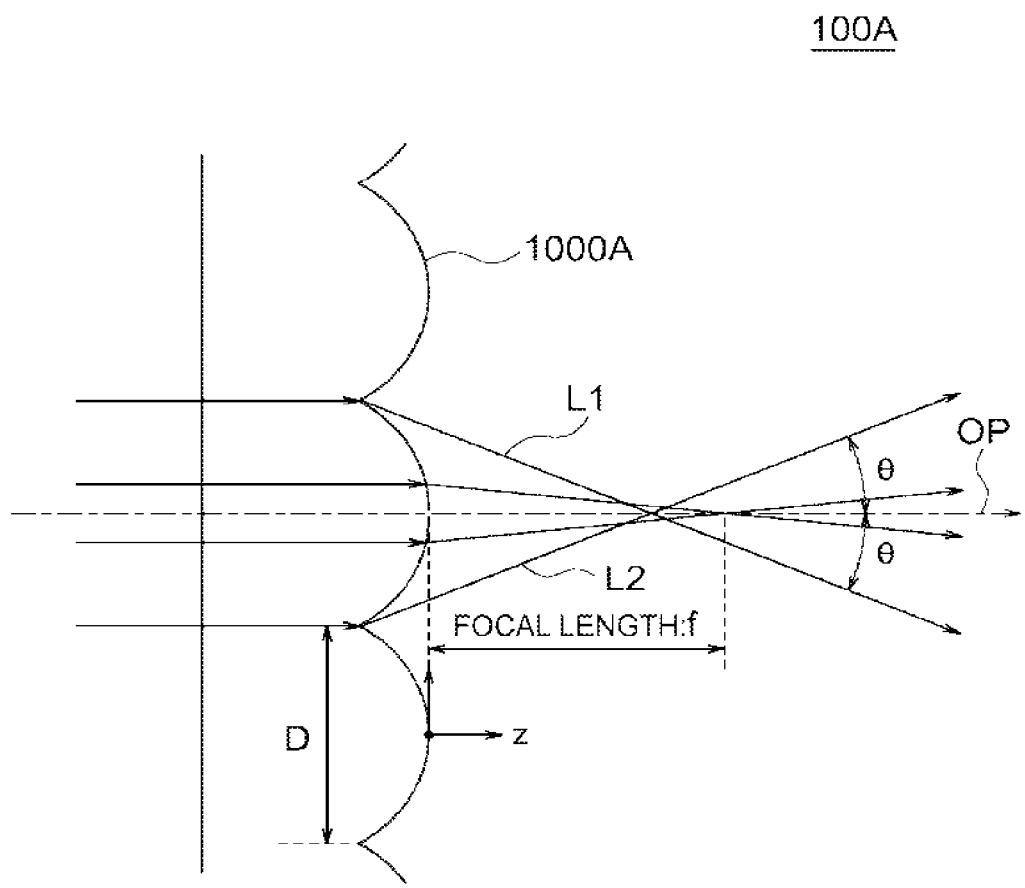

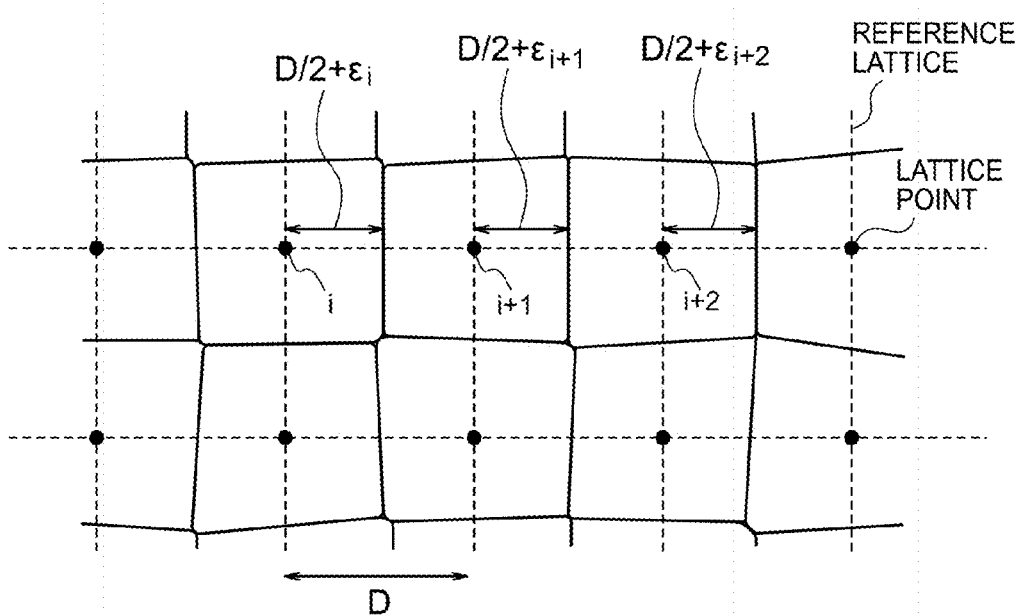

MICROLENS ARRAY AND OPTICAL SYSTEM INCLUDING THE SAME

CROSS REFERENCE TO RELATED APPLICATION

This is a Continuation-in-Part of International Patent Application No. PCT/JP2015/065136 filed May 26, 2015, which designates the U.S. and was published under PCT Article 21(2) in English, and which claims priority from U.S. Provisional Patent Application No. 62/003,190, dated May 27, 2014. The contents of these applications are hereby incorporated by reference.

TECHNICAL FIELD

The present invention relates to a microlens array and an optical system including the same.

BACKGROUND ART

A diffuser that realizes a smooth intensity distribution profile of diffused light is demanded for a wide range of applications, such as general illumination including indoor light, light sources of optical sensors for industrial use, and screens for visual display.

A Gaussian diffuser that realizes a Gaussian intensity profile distribution of diffused light by refraction of incident lights is well known as a diffuser that realizes a smooth intensity distribution profile of diffused light. Gaussian diffusers include a rough surface having a perfectly random height distribution profile. As Gaussian diffusers, one that is produced by a method in which a base material such as glass is sanded to obtain a mold with a rough surface and the roughness of the mold is transferred to a plastic material, one that is produced by a method in which a base material is exposed with a so-called speckle pattern that is a random light intensity pattern produced by interference of light from coherent light sources to obtain a mold and the roughness of the mold is transferred to a plastic material and the like are known. Such Gaussian diffusers provide a natural and smooth intensity distribution profile of light. On the other hand, since the distribution profile does not substantially go out of Gaussian intensity profiles, the design flexibility is small, and the transmittance is reduced with a wide angle of light distribution. Further, with Gaussian diffusers, a surface tends to be recognized as a grainy texture, and a speckle pattern tends to be generated. Accordingly, Gaussian diffusers are not suited for such an application as screens in which a surface is required to have smooth appearance and feel.

For applications in which a higher transmittance or a distribution profile out of Gaussian intensity profiles is required, many devices using a microlens array instead of a Gaussian diffuser have been developed. With a microlens array, an intensity distribution profile of diffused light can be controlled by adjusting the shape of a microlens. Further, a higher transmittance can be obtained in comparison with a rough surface. However, in a microlens array in which microlenses are arranged at small intervals, wave fronts of rays from respective microlenses interfere with one another so that diffracted waves due to the periodic structure of the arrangement are produced, and thereby unevenness in light distribution is disadvantageously generated. Further, if a curvature radius of a microlens becomes small, it becomes disadvantageous that diffraction at the aperture itself of a microlens causes unevenness in light intensity distribution of diffused light.

Under the circumstances, microlens arrays in which arrangement, surface shapes or aperture shapes are made to vary to reduce unevenness of light intensity distribution due to interference and diffraction have been proposed. For example, a focal plane plate for camera focusing in which micro lenses are arranged on a random basis to reduce unevenness of diffused light intensity due to diffraction caused by the periodic structure of a microlens array has been developed (JPS63-221329A and JPH03-192232A). Further, a microlens array in which various features such as an arrangement, a surface shape and an aperture shape are provided with randomness has been developed (JP2006-500621A).

However, prior art documents including the patent documents described above fail to disclose, to a sufficient degree, how arrangement and shapes are made to vary to reduce unevenness of light intensity distribution. Further, in a microlens with a small coverture radius that is required to obtain a distribution with a great angle of divergence, unevenness of light intensity distribution due to diffraction at the aperture of a single microlens, not due to the periodic structure of the microlens array causes a problem. However, a microlens array in which arrangement and shapes are made to vary to reduce unevenness of light intensity distribution including that due to diffraction at the aperture of a single microlens, and an optical system including such a microlens have not been developed.

Accordingly, there is a need for a microlens array in which arrangement and shapes are made to vary to reduce unevenness of light intensity distribution including unevenness of light intensity distribution due to diffraction at the aperture of a single microlens, and an optical system including such a microlens.

SUMMARY OF INVENTION

A microlens array according to a first aspect of the present invention is a microlens array including N microlenses arranged in a predetermined direction on an x-y plane. A projection onto the x-y plane of the lens vertex of each microlens is arranged in the vicinity of a lattice point of a reference lattice on the x-y plane, the lattice spacing of the reference lattice in the predetermined direction being D (millimeters), and when a boundary between microlenses is referred to as a side of a lens, a distance between two sides facing each other is approximately equal to D, and a distance between a projection onto the x-y plane of a lens vertex i and a projection onto the x-y plane of a side between the lens vertex i and a lens vertex i+1 is $$D/2 + \varepsilon_i$$

and for the N microlenses, $$\sigma^2 = \sum_{i=1}^{N} \frac{(\varepsilon_i - \bar{\varepsilon})^2}{N}$$

$$\bar{\varepsilon} = \sum_{i=1}^{N} \frac{\varepsilon_i}{N} = 0,$$

and
letting n represent the refractive index of the material of each microlens, letting R (millimeters) represent the curvature radius in the predetermined direction in the vicinity of the center of each microlens and letting f (millimeters) represent the focal length of each microlens, the relationships $$\frac{0.0042}{D} < \frac{D}{2f} = \frac{D(n-1)}{2R}$$

$$0.0048\sqrt{f}\{1+(D/2f)^2\} < \sigma < 0.014\sqrt{f}\{1+(D/2f)^2\}$$

are satisfied.

In the microlens array according to the present aspect, unevenness in light intensity distribution including unevenness in light intensity distribution due to diffraction at the aperture of a single microlens can be reduced by appropriately varying distance between two sides facing each other, each side forming a boundary between lenses.

As to a microlens array according to a first embodiment of the first aspect of the present invention, in the x-y plane, a boundary between the lens vertex i and the lens vertex i+1, which are adjacent to each other in the predetermined direction, is the perpendicular bisector of the line connecting the lens vertex i and the lens vertex i+1, or an amount of displacement of the boundary from the perpendicular bisector is negligible.

In a microlens array according to a second embodiment of the first aspect of the present invention, the reference lattice is rectangular or hexagonal.

M=1 when the reference lattice is rectangular, and M=2 when the reference lattice is hexagonal.

In a microlens array according to a third embodiment of the first aspect of the present invention, a projection onto the x-y plane of the vertex of each microlens is displaced by $\eta_i$ in the predetermined direction from the corresponding lattice point so as to generate $\varepsilon_i$.

According to the present embodiment, if the microlenses are axisymmetric, a boundary between adjacent microlenses is the perpendicular bisector of the line connecting the vertices of the adjacent microlenses, and no step is generated at the boundary between the adjacent microlenses surfaces.

In a microlens array according to a fourth embodiment of the first aspect of the present invention, the predetermined direction is x and y directions, the reference lattice on the x-y plane is rectangular, the lattice spacing D in the x direction being represented by Dx and the lattice spacing D in the y direction being represented by Dy, and a projection onto the x-y plane of the vertex of each microlens is displaced by $(\eta_{xi}, \eta_{yi})$ from the corresponding lattice point where $\eta_{xi}$ represents $\eta_i$ in the x direction and $\eta_{yi}$ represents $\eta_i$ in the y direction.

In a microlens array according to a fifth embodiment of the first aspect of the present invention, the reference lattice on the x-y plane is rectangular, the points being arranged in the x and y directions, and in the vicinity of the center of each of the microlenses, the curvature radius in the x direction is Rx (millimeters) and the curvature radius in the y direction is Ry (millimeters).

In a microlens array according to a sixth embodiment of the first aspect of the present invention, the relationship $$\frac{0.047}{D} < \frac{D}{2f} = \frac{D(n-1)}{2R}$$

is further satisfied.

In a microlens array according to a seventh embodiment of the first aspect of the present invention, the relationship $$0.0064\sqrt{f}\{1+(D/2f)^2\} < \sigma < 0.014\sqrt{f}\{1+(D/2f)^2\}$$

is further satisfied.

In a microlens array according to an eighth embodiment of the first aspect of the present invention, the vertex positions of plural microlenses are displaced with respect to one another in the direction that is perpendicular to the x-y plane so as to weaken a dark spot.

In a microlens array according to a ninth embodiment of the first aspect of the present invention, the vertex positions of microlenses are uniformly distributed in the direction perpendicular to the x-y plane in the range from 0 to 0.55/(n−1) (micrometers) with respect to a predetermined value of thickness of the microlens that is a distance from the vertex to the bottom of the microlens array.

According to the present embodiment, a so-called dark spot can be weaken by shifting phases of lights from plural microlenses by displacing the vertices of the plural microlenses with respect to one another in the direction that is perpendicular to the x-y plane, that is, the lattice plane.

In a microlens array according to a tenth embodiment of the first aspect of the present invention, when the maximum value of the absolute value of $\varepsilon_i$ is represented by $|\varepsilon_i|$ max, the relationship $$|\varepsilon_i|_{max} < 3\sigma$$

is satisfied.

An optical system according to a second aspect of the present invention is an optical system including a light source emitting lights, the minimum wavelength of the lights being λ (micrometers), and a microlens array configured to diverge the lights from the light source. The microlens array includes N microlenses arranged in a predetermined direction on an x-y plane. A projection onto the x-y plane of the lens vertex of each microlens is arranged in the vicinity of a lattice point of a reference lattice on the x-y plane, the lattice spacing of the reference lattice in the predetermined direction being D, and when a boundary between microlenses is referred to as a side of a lens, a distance between two sides facing each other is approximately equal to D, and a distance between a projection onto the x-y plane of a lens vertex i and a projection onto the x-y plane of a side between the lens vertex i and a lens vertex i+1 is $$D/2 + \varepsilon_i,$$

and for the N microlenses, $$\sigma^2 = \sum_{i=1}^{N} \frac{(\varepsilon_i - \bar{\varepsilon})^2}{N}$$

$$\bar{\varepsilon} = \sum_{i=1}^{N} \frac{\varepsilon_i}{N} = 0,$$

and letting n represent the refractive index of the material of each microlens, letting R (millimeters) represent the curvature radius in the predetermined direction in the vicinity of the center of each microlens and letting f (millimeters) represent the focal length of each microlens, the relationships $$\frac{0.0042}{D} < \frac{D}{2f} = \frac{D(n-1)}{2R}$$

-continued $$0.0048\sqrt{f}\{1+(D/2f)^2\} < \sigma < 0.014\sqrt{f}\{1+(D/2f)^2\}$$

are satisfied.

In the optical system according to the present aspect, unevenness in light intensity distribution including unevenness in light intensity distribution due to diffraction at the aperture of a single microlens can be reduced by appropriately varying distance between two sides facing each other, each side forming a boundary between lenses.

As to a microlens array according to a first embodiment of the second aspect of the invention, in the x-y plane, a boundary between the lens vertex i and the lens vertex i+1, which are adjacent to each other in the predetermined direction, is the perpendicular bisector of the line connecting the lens vertex i and the lens vertex i+1, or an amount of displacement of the boundary from the perpendicular bisector is negligible.

As to an optical system of a second embodiment of the second aspect of the present invention, in the microlenses of the microlens array, the relationship $$\frac{0.047}{D} < \frac{D}{2f} = \frac{D(n-1)}{2R}$$

is further satisfied.

As to an optical system of a third embodiment of the second aspect of the present invention, in the microlenses of the microlens array, the relationship $$0.0064\sqrt{f}\{1+(D/2f)^2\} < \sigma < 0.014\sqrt{f}\{1+(D/2f)^2\}$$

is further satisfied.

In an optical system of a fourth embodiment of the second aspect of the present invention, the vertex positions of plural microlenses are displaced with respect to one another in the direction that is perpendicular to the x-y plane so as to weaken a dark spot.

As to an optical system of a fifth embodiment of the second aspect of the present invention, the vertex positions of microlenses are uniformly distributed in the direction perpendicular to the x-y plane in the range from 0 to $\lambda/(n-1)$ with respect to a predetermined value of thickness of the microlens that is a distance from the vertex to the bottom of the microlens array.

According to the present embodiment, a so-called dark spot can be weaken by shifting phases of lights from plural microlenses by displacing the vertices of the plural microlenses with respect to one another in the direction that is perpendicular to the x-y plane, that is, the lattice plane.

As to an optical system of a sixth embodiment of the second aspect of the present invention, the optical system includes light sources of n different values of wavelength $\lambda 1$, $\lambda 2$, ... and $\lambda n$, and letting $\lambda$multi represent a constant that is determined such that letting Remi represent the reminder when $\lambda$multi is divided by $\lambda i$, the relationship Remi<($\lambda i/10$) or Remi>($9\lambda i/10$)

is satisfied for any i, the vertex positions of the microlenses are uniformly distributed in the direction perpendicular to the x-y plane in the range from 0 to $\lambda$multi/(n-1) with respect to a predetermined value of thickness of the microlens that is a distance from the vertex to the bottom of the microlens array.

BRIEF DESCRIPTION OF DRAWINGS

FIG. 2 shows a cross section of a microlens array of a prior art;

FIG. 13 shows a state in which vertices of microlenses are fixed at lattice points of the reference lattice that is a square lattice, and values of aperture are made to vary;

DESCRIPTION OF EMBODIMENTS

Figure 1:
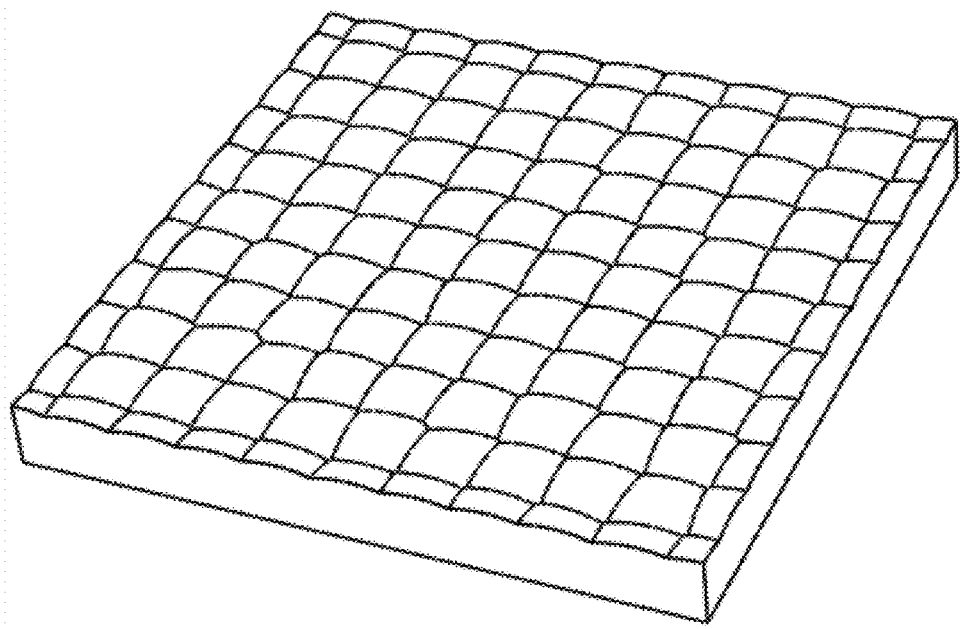
FIG. 1 shows a microlens array according to an embodiment of the present invention.

FIG. 1 shows a microlens array according to an embodiment of the present invention. The microlens array includes plural microlenses having substantially identical shape and arranged on a plane. The structural feature of the microlens array according to the present invention will be described later.

FIG. 2 shows a cross section of a microlens array 100A of a prior art. Light rays normally incident onto a plane on the left side of FIG. 2 are refracted by the convex surface of the microlens 1000A. The plane on the left side of FIG. 2 is referred to as the bottom of the microlens array 100A. The straight line that passes through the vertex of the microlens 1000A and is perpendicular to the bottom is defined as z axis. The direction in which light travels is defined as the positive direction of z axis. In the plane that contains the vertex of the microlens 1000A and is perpendicular to z axis, x axis and y axis that are orthogonal to each other are defined. FIG. 2 shows a cross section containing z axis of the microlens 1000A. In FIG. 2, z axis is marked with OP.

The convex surface of the microlens 1000A can be expressed by the following expression for example. In the following expression and the expressions in paragraphs [0064] and [0125], "n" represents an integer.

$$z = \frac{cr^2}{1+\sqrt{1-(1+k)c^2r^2}} + \sum_n \alpha_n r^{2n}$$

In the expression, r represents distance from z axis, and c represents the curvature at the center of the lens. The following relationship holds between c and curvature radius R. $\alpha_n$ represents a coefficient.

$r=\sqrt{x^2+y^2}$ $c=1/R$

Further, the convex surface of the microlens 1000A can be expressed by the following expression as another example.

$$z = \frac{cr^2}{1+\sqrt{1-(1+k)c^2r^2}} + \sum_n \sum_m \alpha_{nm} x^n y^m$$

In the expression, r represents distance from z axis.

$r=\sqrt{x^2+y^2}$ c represents the curvature at the center of the axis-symmetric term. The curvature radius at the center in the x axis direction Rx and the curvature radius at the center in the y axis direction Ry are expressed by the following expressions in consideration of the second-order coefficients $\alpha_{nm}$ as well.

$c+2\alpha_{20}=1/R_x$ $c+2\alpha_{02}=1/R_y$

In FIG. 2, light rays L1 and L2 are normally incident onto the bottom of the microlens array 100A and pass through the periphery of the microlens 1000A. The angle that L1 forms with z axis is identical with the angle that L2 forms with z axis. This angle is referred to as an angle of divergence and represented as θ. When the focal length of the microlens 1000A is represented as f, and the aperture width of the microlens 1000A is represented as D, angle θ can be expressed by the following expressions.

$$\tan\theta = \frac{D}{2f} \quad (1)$$

$$\theta = \arctan\left(\frac{D}{2f}\right)$$

Further, the focal length of the microlens 1000A is expressed by the following expression when the refractive index of a material of the microlens array is represented as n and the curvature at the center is represented as R.

$$f = \frac{R}{n-1} \quad (2)$$

It is known that when a light beam is converged by a microlens array of a prior art, unevenness in light intensity distribution of diverged light is generated due to diffraction caused by the arrangement of plural microlenses and due to diffraction at the aperture of a single microlens. Such unevenness in light intensity distribution appears particularly conspicuously when a coherent light source such as a laser diode is employed.

Figure 3A:
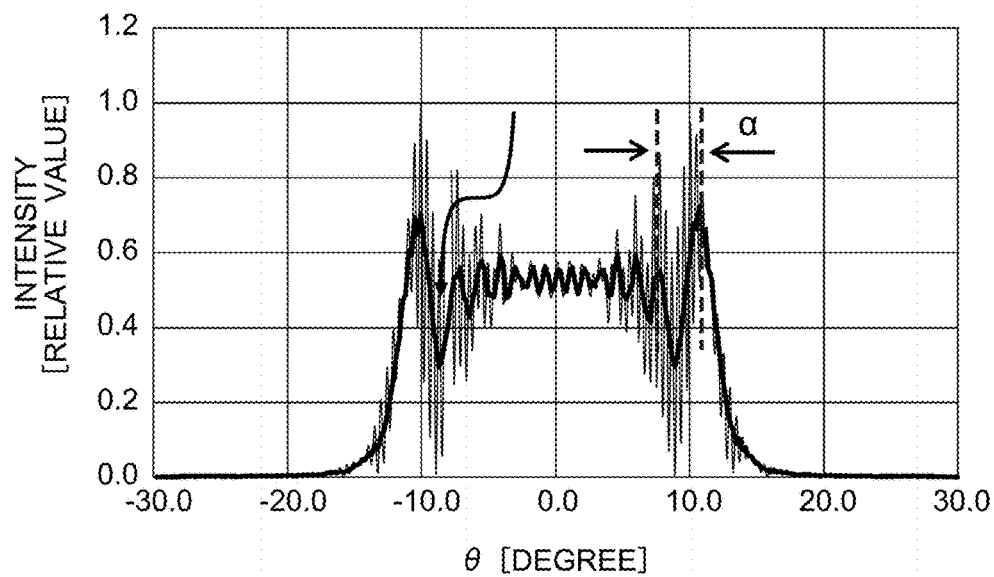
FIG. 3A shows a light intensity distribution obtained when a light beam of wavelength of 550 nm is normally incident onto the bottom of a microlens array that includes microlenses with n=1.5, R=0.075 [mm], and D=0.07 [mm] and is diverged.

FIG. 3A shows a light intensity distribution obtained when a light beam of wavelength of 550 nm is normally incident onto the bottom of a microlens array that includes microlenses with n=1.5, R=0.075 [mm], and D=0.07 [mm] and is diverged.

Figure 3B:
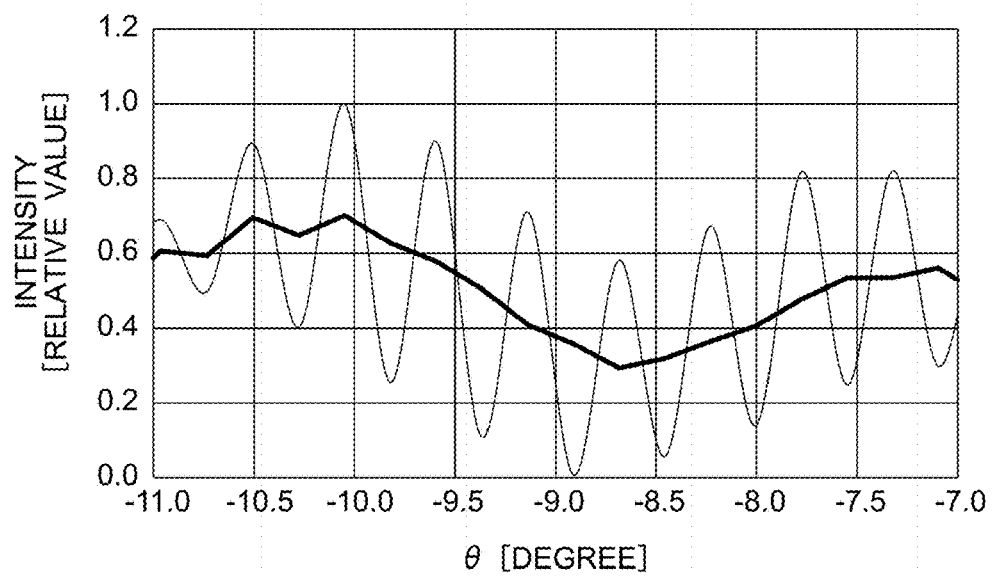
FIG. 3B is an enlarged drawing of a portion of FIG. 3A in a range of angle θ from −11 degrees to −7 degrees.

FIG. 3B is an enlarged drawing of a portion of FIG. 3A in a range of angle θ from −11 degrees to −7 degrees.

The horizontal axes of FIGS. 3A and 3B represent angle θ of divergence, and the vertical axes of FIGS. 3A and 3B represent relative value of intensity of light. The unit of angle θ is degree.

In FIGS. 3A and 3B, the thin line represents intensity of light, and the heavy line represents a one-degree moving average of intensity of light. For example, the value of the heavy line at −9.0 degree represents the average value of the values of the thin line in the rage from −8.5 degrees to −9.5 degrees. According to FIG. 3B, the intensity of light has a component that has a period of approximately 0.5 degrees and is represented by the thin line and a component that has a period of several degrees and is represented by the heavy line. The component that has a period of approximately 0.5 degrees and is represented by the thin line is generated due to diffraction caused by the arrangement of plural microlenses, and the component that has a period of several degrees and is represented by the heavy line is generated due to diffraction at the aperture of a single microlens. In the case that the aperture width of a microlens is several tens of micrometers or more like the present example, the component caused by the aperture of a microlens becomes greater.

According to FIG. 3A, the intensity represented by the heavy line is 0.3 or more in the range from approximately −12 degrees to approximately +12 degrees, and a peak-to-valley difference in intensity shows a maximum value between the outmost peak, that is, the peak with the greatest absolute value of angle in the above-described range and the valley adjacent to the utmost peak and inside the range. A difference in angle between the peak with the greatest absolute value of angle and the peak with the second greatest absolute value of angle is defined as period α, which is used as a parameter of intensity of light diverged by a microlens array. The difference in angle between the peak with the greatest absolute value of angle and the peak with the second greatest absolute value of angle can be determined by performing a least-square fitting of a combination of two Gaussian functions and obtaining the interval between the peaks of the two Gaussian functions, by way of example.

How the above-described component that has a period of several degrees and is represented by the heavy line is affected by the shape of a microlens will be reviewed below.

Figure 4A:
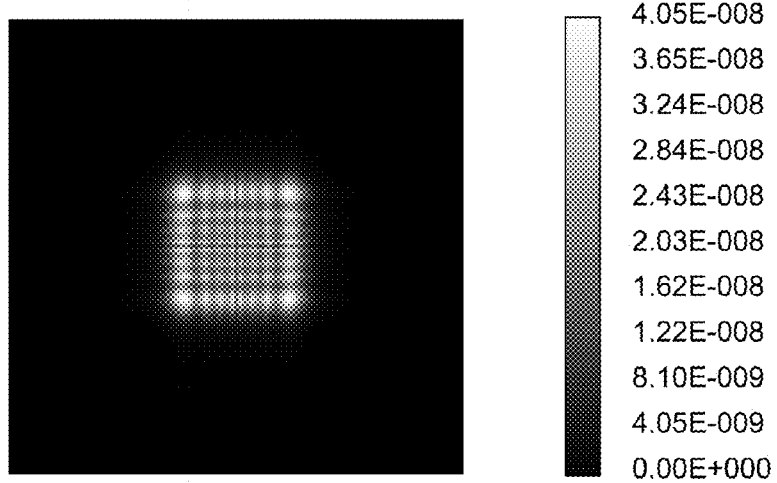
FIG. 4A shows an illuminated area when a light beam of wavelength of 550 nm is normally incident onto the bottom of a microlens array that includes microlenses with n=1.5, R=0.075 [mm], and D=0.05 [mm] and is diverged.

FIG. 4A shows an illuminated area when a light beam of wavelength of 550 nm is normally incident onto the bottom of a microlens array that includes microlenses with n=1.5, R=0.075 [mm], and D=0.05 [mm] and is diverged.

Figure 4B:
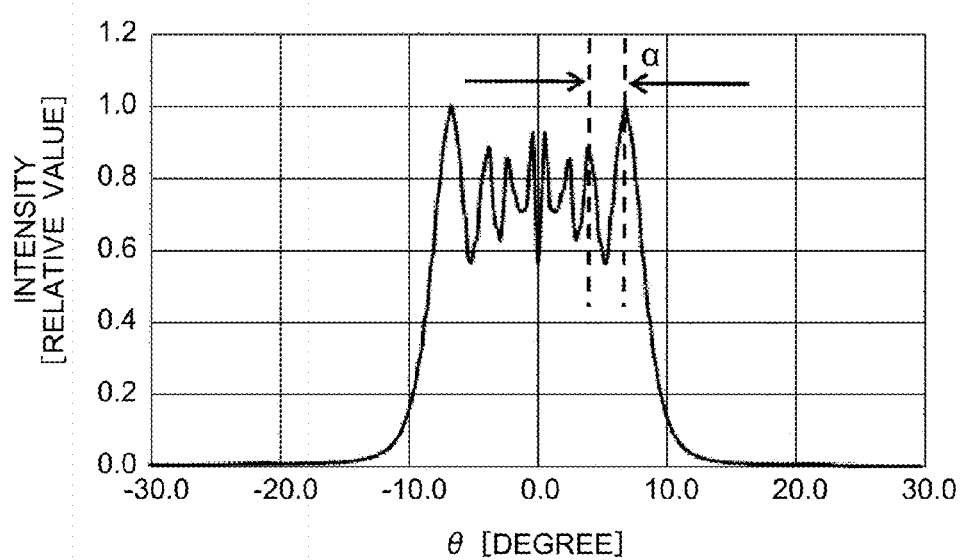
FIG. 4B shows a light intensity distribution obtained when a light beam of wavelength of 550 nm is normally incident onto the bottom of a microlens array that includes microlenses with n=1.5, R=0.075 [mm], and D=0.05 [mm] and is diverged.

FIG. 4B shows a light intensity distribution obtained when a light beam of wavelength of 550 nm is normally incident onto the bottom of a microlens array that includes microlenses with n=1.5, R=0.075 [mm], and D=0.05 [mm] and is diverged. The horizontal axis of FIG. 4B represents angle θ of divergence, and the vertical axis of FIG. 4B represents relative value of intensity of light. The unit of angle θ is degree.

Figure 5A:
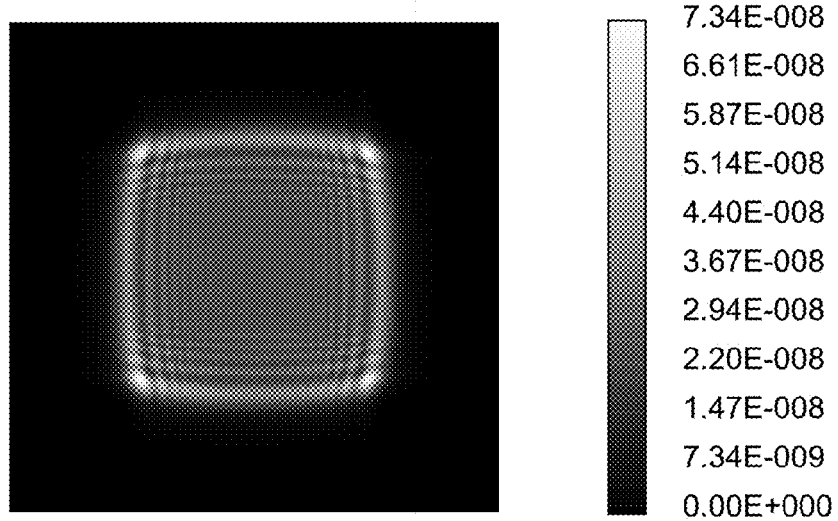
FIG. 5A shows an illuminated area when a light beam of wavelength of 550 nm is normally incident onto the bottom of a microlens array that includes microlenses with n=1.5, R=0.075 [mm], and D=0.1 [mm] and is diverged.

FIG. 5A shows an illuminated area when a light beam of wavelength of 550 nm is normally incident onto the bottom of a microlens array that includes microlenses with n=1.5, R=0.075 [mm], and D=0.1 [mm] and is diverged.

Figure 5B:
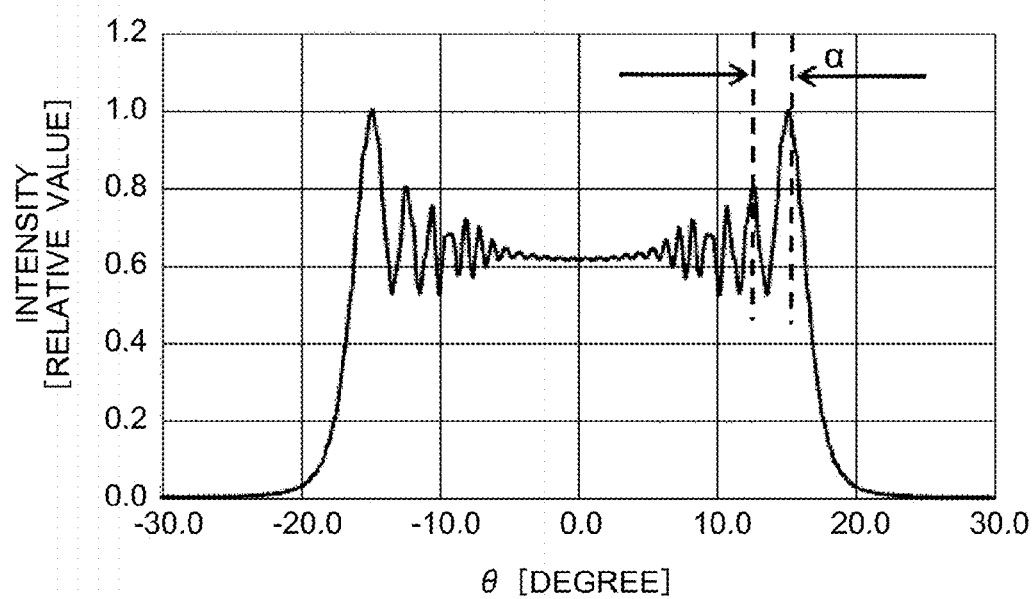
FIG. 5B shows a light intensity distribution obtained when a light beam of wavelength of 550 nm is normally incident onto the bottom of a microlens array that includes microlenses with n=1.5, R=0.075 [mm], and D=0.1 [mm] and is diverged.

FIG. 5B shows a light intensity distribution obtained when a light beam of wavelength of 550 nm is normally incident onto the bottom of a microlens array that includes microlenses with n=1.5, R=0.075 [mm], and D=0.1 [mm] and is diverged. The horizontal axis of FIG. 5B represents angle θ of divergence, and the vertical axis of FIG. 5B represents relative value of intensity of light. The unit of angle θ is degree.

Figure 6A:
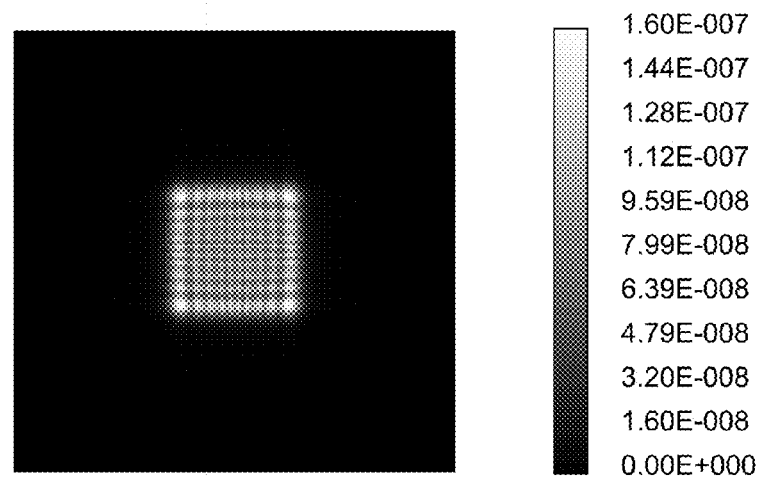
FIG. 6A shows an illuminated area when a light beam of wavelength of 550 nm is normally incident onto the bottom of a microlens array that includes microlenses with n=1.5, R=0.15 [mm], and D=0.1 [mm] and is diverged.

FIG. 6A shows an illuminated area when a light beam of wavelength of 550 nm is normally incident onto the bottom of a microlens array that includes microlenses with n=1.5, R=0.15 [mm], and D=0.1 [mm] and is diverged.

Figure 6B:
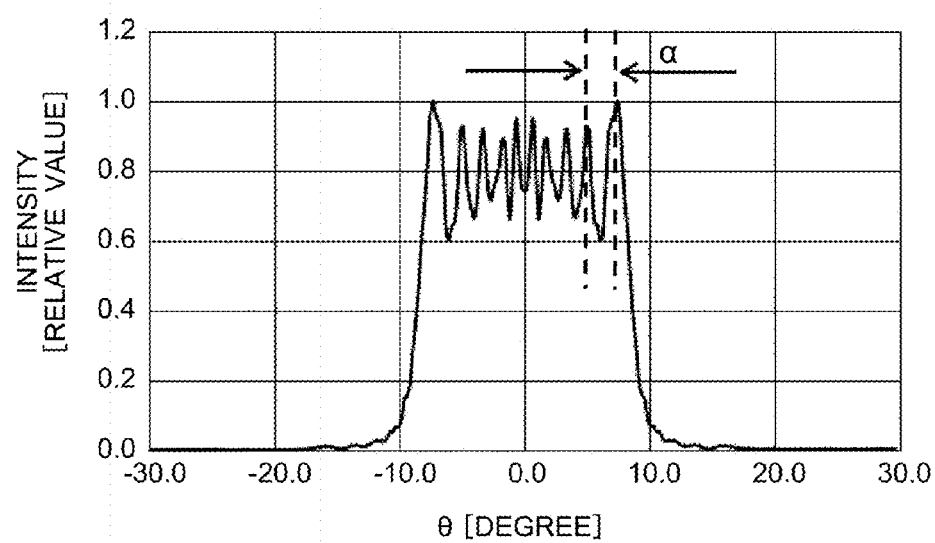
FIG. 6B shows a light intensity distribution obtained when a light beam of wavelength of 550 nm is normally incident onto the bottom of a microlens array that includes microlenses with n=1.5, R=0.15 [mm], and D=0.1 [mm] and is diverged.

FIG. 6B shows a light intensity distribution obtained when a light beam of wavelength of 550 nm is normally incident onto the bottom of a microlens array that includes microlenses with n=1.5, R=0.15 [mm], and D=0.1 [mm] and is diverged. The horizontal axis of FIG. 6B represents angle θ of divergence, and the vertical axis of FIG. 6B represents relative value of intensity of light. The unit of angle θ is degree.

The microlens of FIG. 4B and that of FIG. 5B differ from each other in aperture width D. The range of angle θ of divergence where intensity of light is greater than 0.2 is from approximately −10 degrees to approximately +10 degrees in FIG. 4B, and from approximately −17 degrees to approximately +17 degrees in FIG. 5B. The period α is approximately 3 degrees both in FIG. 4B and FIG. 5B.

The microlens of FIG. 5B and that of FIG. 6B differ from each other in radius of curvature R at the center. The range of angle θ of divergence where intensity of light is greater than 0.2 is from approximately −17 degrees to −17 degrees to +17 degrees +17 degrees in FIG. 5B, and from approximately −9 degrees to approximately +9 degrees in FIG. 6B. The period α is approximately 3 degrees in FIG. 5B and approximately 2 degrees in FIG. 6B.

Figure 7:
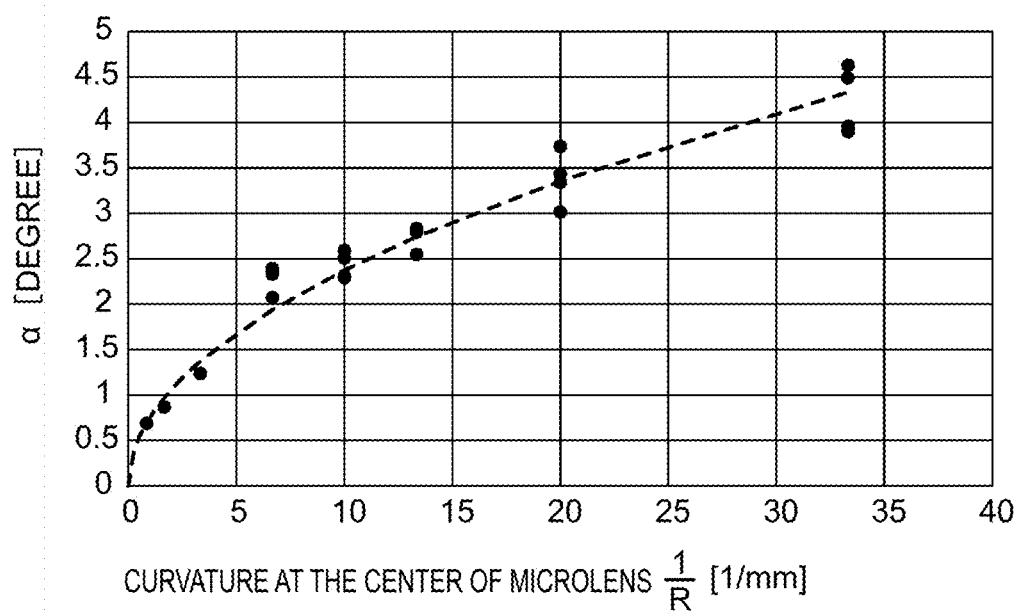
FIG. 7 shows a relationship between curvature at the center of a microlens and period α.

FIG. 7 shows a relationship between curvature at the center of a microlens and period α. The horizontal axis of Fi. 7 represents curvature at the center (1/R) of a microlens, and the vertical axis of FIG. 7 represents period α. The unit of the horizontal axis is 1/millimeter, and the unit of the vertical axis is degree. Further, the dashed line in FIG. 7 shows the curve that is obtained by fitting the following equation to points showing the relationship between curvature at the center (1/R) and period α.

$$\alpha = a_1 \sqrt{\frac{1}{R}}$$

Thus, square of period α and curvature at the center (1/R) are in a proportional relationship.

Figure 8:
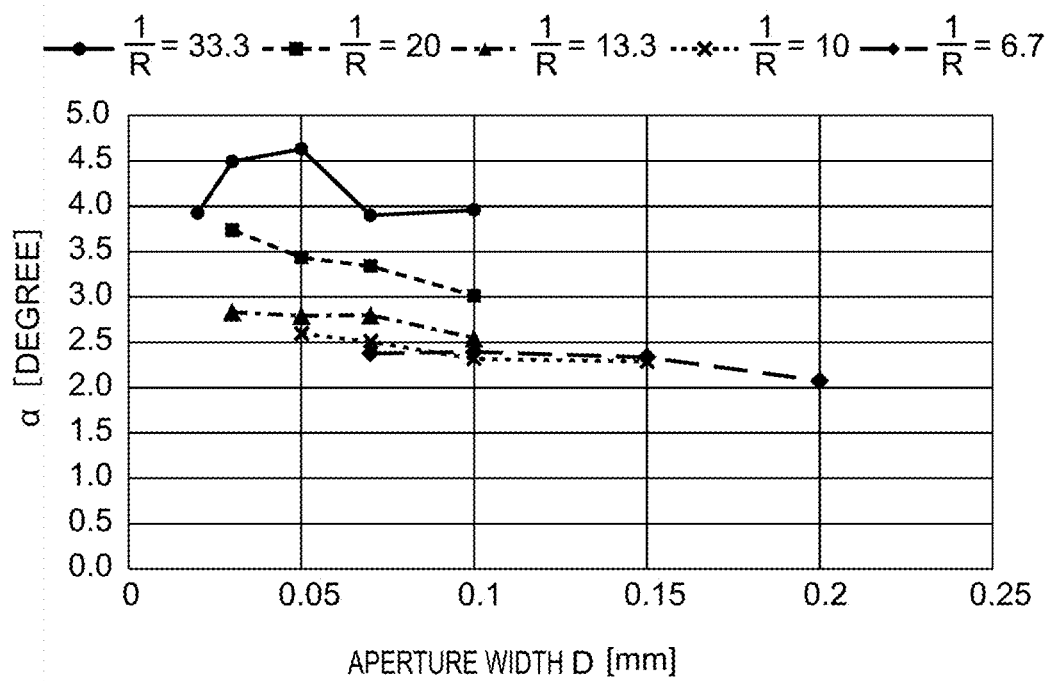
FIG. 8 shows a relationship between aperture width D of a microlens and period α.

FIG. 8 shows a relationship between aperture width D of a microlens and period α. The horizontal axis of Fi. 8 represents aperture width D of a microlens, and the vertical axis of FIG. 8 represents period α. The unit of the horizontal axis is millimeter, and the unit of the vertical axis is degree. According to FIG. 8, no significant correlation between period α and aperture width D is recognized.

Figure 9:
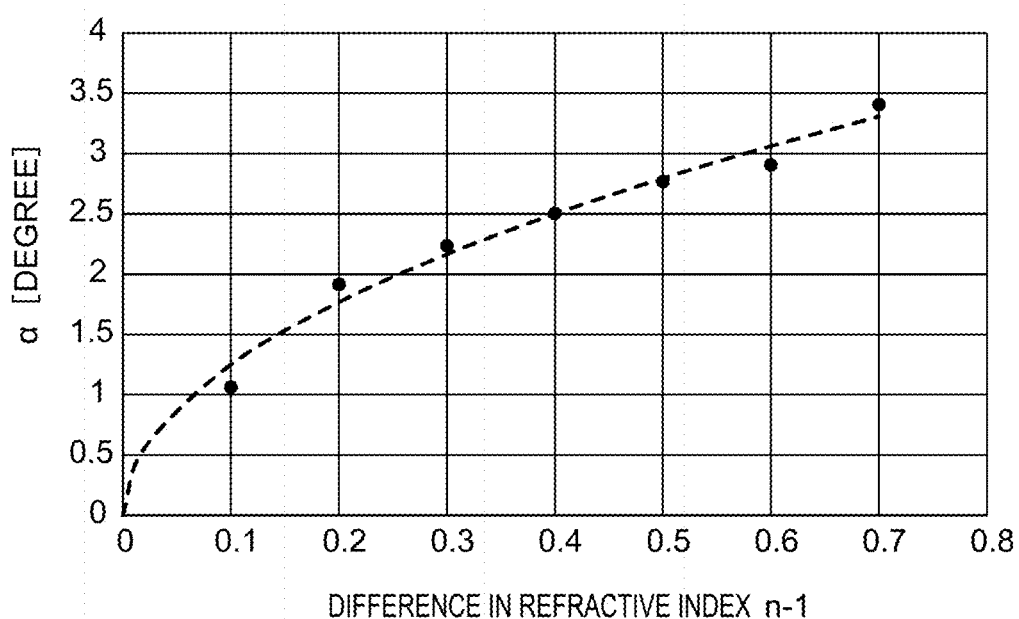
FIG. 9 shows a relationship between difference in refractive index between the material of a microlens and the media surrounding it and period α.

FIG. 9 shows a relationship between difference in refractive index between the material of a microlens and the media surrounding it and period α. The horizontal axis of Fi. 9 represents difference in refractive index (n−1) between the material of a microlens and the media surrounding it, and the vertical axis of FIG. 9 represents period α. The unit of the vertical axis is degree. Further, the dashed line in FIG. 9 shows the curve that is obtained by fitting the following equation to points showing the relationship between difference in refractive index (n−1) between the material of a microlens and the media surrounding it and period α.

$$\alpha = a_2 \sqrt{n-1}$$

Thus, square of period α and difference in refractive index (n−1) between the material of a microlens and the media surrounding it are in a proportional relationship.

Figure 10:
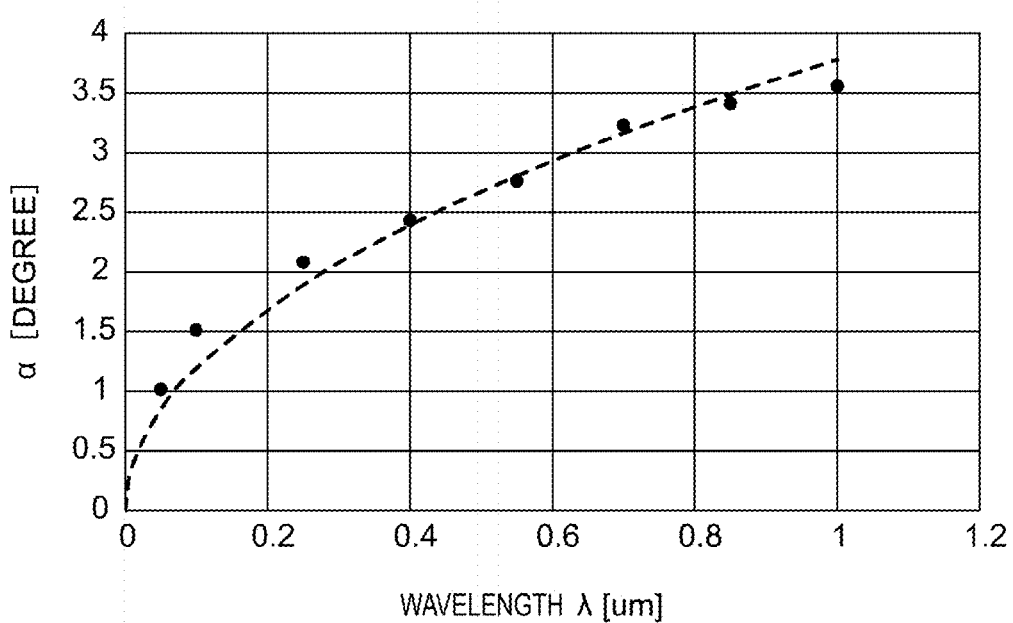
FIG. 10 shows a relationship between wavelength λ of incident beam and period α.

FIG. 10 shows a relationship between wavelength λ of incident beam and period α. The horizontal axis of Fi. 10 represents wavelength λ of incident beam, and the vertical axis of FIG. 10 represents period α. The unit of the horizontal axis is micrometer, and the unit of the vertical axis is degree. Further, the dashed line in FIG. 10 shows the curve that is obtained by fitting the following equation to points showing the relationship between wavelength λ of incident beam and period α.

$$\alpha = a_3 \sqrt{\lambda}$$

Thus, square of period α and wavelength Δ of incident beam are in a proportional relationship.

The following expression can be obtained from Expression (2) and the results described above.

$$\alpha \approx 1.43\sqrt{\frac{\lambda(n-1)}{R}} = 1.43\sqrt{\frac{\lambda}{f}} \quad (3)$$

How a displacement of a boundary between microlens surfaces, which defines the aperture of a microlens affects angle θ of divergence will be reviewed below.

Figure 11:
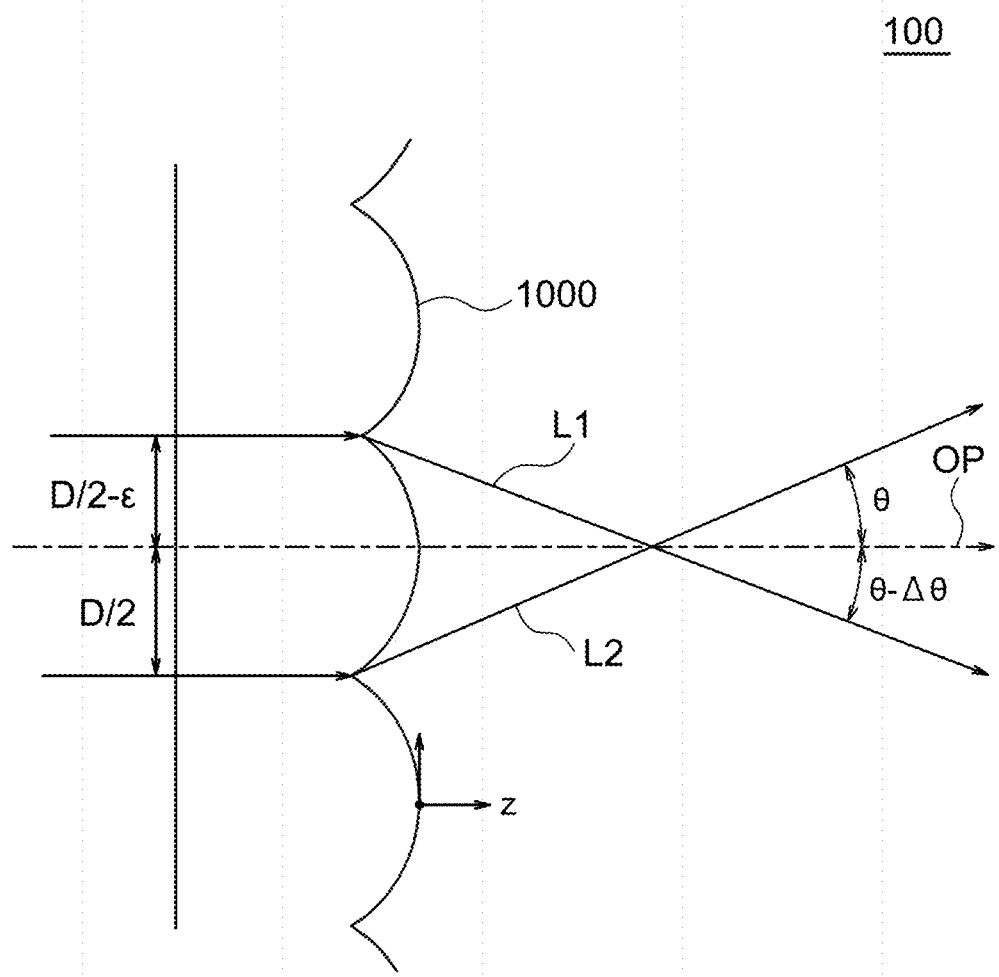
FIG. 11 shows a cross section of a microlens array 100.

FIG. 11 shows a cross section of a microlens array 100. Light incident onto the bottom of the microlens array 100 of FIG. 11 is refracted by the convex surface of the microlens 1000 of FIG. 11. The straight line that passes through the vertex of the microlens 1000 and is perpendicular to the bottom is defined as a z axis. The direction in which light travels is defined as the positive direction of the z axis. In the plane that contains the vertex of the microlens 1000 and is perpendicular to the z axis, an x axis and a y axis that are orthogonal to each other are defined. FIG. 11 shows a cross section containing the x axis and the z axis of the microlens 1000. In FIG. 11, the z axis is marked with OP.

As shown in FIG. 11, a displacement in the x axis direction of c of the boundary between lens surfaces changes angle θ of divergence by Δθ. Using Expression (1), the relationship between c and Δθ can be expressed by the following expressions. As shown in FIG. 11, ε represents a dispersion from D/2 of values of distance between a projection onto an x-y plane of a microlens vertex and a projection onto the x-y plane of the boundary.

$$\tan(\theta - \Delta\theta) = \frac{D - 2\varepsilon}{2f}$$

$$\frac{\tan\theta - \tan\Delta\theta}{1 + \tan\theta\tan\Delta\theta} = \frac{D - 2\varepsilon}{2f}$$

$$\tan\Delta\theta = \frac{4\varepsilon f}{4f^2 + D^2} = \frac{\varepsilon}{\{1 + (D/2f)^2\}f}$$

Since Δθ is sufficiently small, the following relationship holds.

$$\Delta\theta \approx \frac{360}{2\pi}\tan\Delta\theta = \frac{360\varepsilon}{2\pi\{1 + (D/2f)^2\}f} \quad (4)$$

When a difference Δθ in angle of divergence between two microlenses that are arbitrarily chosen is half the period α, the component generated due to diffraction at the aperture of one microlens and that generated due to diffraction at the aperture of the other microlens cancel each other and are reduced. In other words, the components generated due to diffraction at the apertures cancel each other and are reduced when the following relationship holds.

$$\Delta\theta_2 - \Delta\theta_1 = \frac{\alpha}{2} \quad (5)$$

By substituting Expressions (3) and (4) into Expression (5), the following expressions can be obtained.

$$\frac{360(\varepsilon_2 - \varepsilon_1)}{2\pi\{1 + (D/2f)^2\}f} = \frac{1.43}{2}\sqrt{\frac{\lambda}{f}} \quad (6)$$

$$\varepsilon_2 - \varepsilon_1 = 0.0125\sqrt{\lambda f}\{1 + (D/2f)^2\}$$

In the whole microlens array including plural microlenses, it is preferable to make displacement ε of the boundary between lens surfaces vary in order to reduce components generated due to diffraction at the apertures of the plural microlenses. When variance of displacement ε of the boundary between lens surfaces is represented by $\sigma^2$, the following relationship should preferably be satisfied.

$$0.0062\sqrt{\lambda f}\{1+(D/2f)^2\} < \sigma < 0.019\sqrt{\lambda f}\{1+(D/2f)^2\} \quad (7)$$

where the following relationships hold.

$$\sigma^2 = \sum_{i=1}^{N} \frac{(\varepsilon_i - \bar{\varepsilon})^2}{N}$$

$$\bar{\varepsilon} = \sum_{i=1}^{N} \frac{\varepsilon_i}{N} = 0$$

Assuming that the wavelength of light of the light source is 0.5876 μm of d line, the following relationship should preferably be satisfied. Hereinafter the standard deviation of the dispersion ε is represented by σ.

$$0.0048\sqrt{f}\{1+(D/2f)^2\} < \sigma < 0.014\sqrt{f}\{1+(D/2f)^2\} \quad (8)$$

When the value does not reach the lower limit in Expressions (7) or (8), components generated by diffraction at apertures cannot be reduced to a sufficient degree. Further, the value exceeds the upper limit in Expressions (7) or (8), uniformity of intensity distribution of diverged light deteriorates, and the tangential angle of a microlens becomes so steep that manufacturing thereof becomes difficult.

Further, the following relationships should more preferably be satisfied.

$$0.0083\sqrt{\lambda f}\{1 + (D/2f)^2\} < \sigma < 0.019\sqrt{\lambda f}\{1 + (D/2f)^2\} \quad (9)$$

$$0.0064\sqrt{f}\{1 + (D/2f)^2\} < \sigma < 0.014\sqrt{f}\{1 + (D/2f)^2\} \quad (10)$$

Further, the following relationships should still more preferably be satisfied.

$$0.0113\sqrt{\lambda f}\{1 + (D/2f)^2\} < \sigma < 0.0138\sqrt{\lambda f}\{1 + (D/2f)^2\} \quad (11)$$

$$0.0086\sqrt{f}\{1 + (D/2f)^2\} < \sigma < 0.0106\sqrt{f}\{1 + (D/2f)^2\} \quad (12)$$

Letting |ε| max represent the maximum value of the absolute value of a displacement ε of the boundary between lens surfaces, the following relationship should preferably be satisfied.

$$|\varepsilon|_{max} < 3\sigma \quad (13)$$

Further, the following relationship should more preferably be satisfied.

$$|\varepsilon|_{max} < 2.5\sigma \quad (14)$$

Period β of the component that is generated due to diffraction caused by the arrangement of plural microlenses and is represented by the thin line in FIGS. 3A and 3B will be reviewed below. When the period of the arrangement, that is, the aperture width of a microlens is represented as D (millimeters), and the wavelength of light is represented as λ (micrometers), β can be represented as below from the equation of diffraction.

$$\beta \approx \sin\beta = \frac{360}{2\pi}\frac{\lambda}{1000 D} \quad (15)$$

When a ratio of period α of the component that is generated due to diffraction at the aperture of a single microlens to period β of the component that is generated due to diffraction caused by the arrangement of plural microlenses is represented as M, M can be represented as below using Expressions (3) and (15).

$$M = \frac{\alpha}{\beta} = \frac{25 D}{\sqrt{\lambda f}}$$

The following expressions can be obtained using Expression (1).

$$M = 25\sqrt{\frac{2D\tan\theta}{\lambda}}$$

$$\frac{8.0E^{-4}M^2\lambda}{D} = \tan\theta$$

In order that the present invention is effective, α has to be significantly greater than β, and M should preferably be greater than 3. Accordingly, the following relationship should preferably be satisfied.

$$\frac{0.0072\lambda}{D} < \tan\theta \quad (16)$$

Assuming that the wavelength of light of the light source is 0.5876 μm of d line, the following relationship should preferably be satisfied.

$$\frac{0.0042}{D} < \tan\theta \quad (17)$$

Further, M should more preferably be greater than 10. Accordingly, the following relationships should more preferably be satisfied.

$$\frac{0.080\lambda}{D} < \tan\theta \quad (18)$$

$$\frac{0.047}{D} < \tan\theta \quad (19)$$

Figure 12:
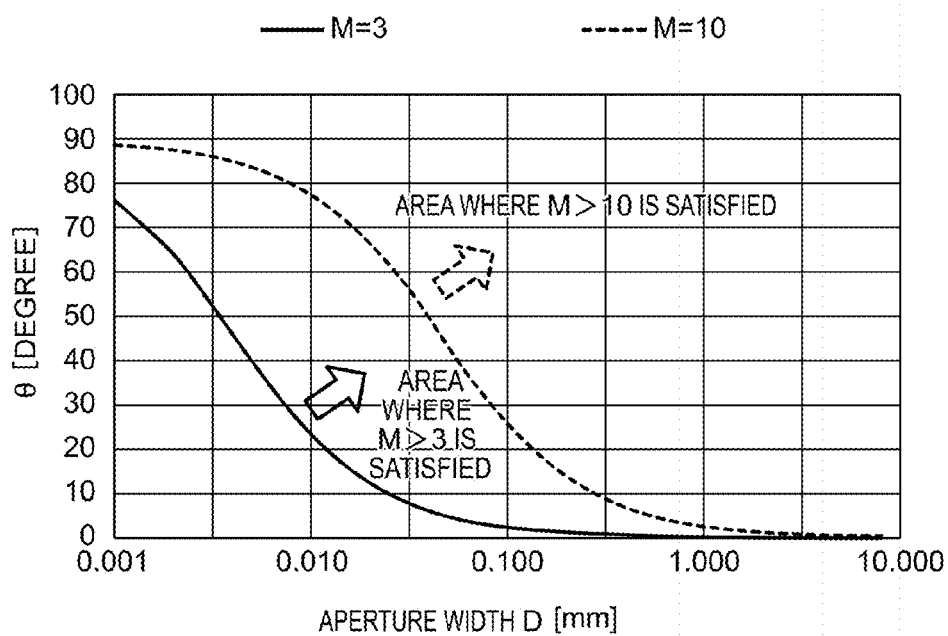
FIG. 12 shows areas where aperture width D and angle θ of divergence satisfy Expression (17) and (19) respectively.

FIG. 12 shows areas where aperture width D and angle θ of divergence satisfy Expression (17) and (19) respectively. The horizontal axis of FIG. 12 represents aperture width D, and the vertical axis of FIG. 12 represents angle θ of divergence. The unit of the horizontal axis is millimeter, and that of the vertical axis is degree. It can be seen that the present invention is very effective in the case of a large angle θ of divergence even if the aperture width D of a microlens is of the order of several tens of micrometers.

If θ is eliminated from Expressions (16) to (19) using Expression (1), Expressions (20) to (23) are obtained.

$$\frac{0.0072\lambda}{D} < \frac{D}{2f} = \frac{D(n-1)}{2R} \quad (20)$$

$$\frac{0.0042}{D} < \frac{D}{2f} = \frac{D(n-1)}{2R} \quad (21)$$

$$\frac{0.080\lambda}{D} < \frac{D}{2f} = \frac{D(n-1)}{2R} \quad (22)$$

$$\frac{0.047}{D} < \frac{D}{2f} = \frac{D(n-1)}{2R} \quad (23)$$

How to make the aperture width D vary among plural microlenses such that Expression (7) is satisfied, for example, will be described.

FIG. 13 shows a state in which vertices of microlenses are fixed at lattice points of the reference lattice that is a square lattice, and values of aperture width are made to vary. The bottom of the microlens array that is parallel to the lattice plane is designated as an x-y plane. Letting D represent the lattice spacing and letting i represent an integer that identifies each lattice point and the lens vertex corresponding to the lattice point, a distance from a projection onto the x-y plane of a lens vertex i corresponding to a lattice point i to a projection onto the x-y plane of a boundary between the lens vertex i and a lens vertex i+1 that is adjacent to the lens vertex i in a predetermined direction is D/2+εi. εi represents a deviation of a distance from the projection onto the x-y plane of the lens vertex i to the projection onto the x-y plane of the boundary between the lens vertex i and the lens vertex i+1. In this case, a discontinuous step is generated at a boundary between adjacent microlenses. Such a step may cause an undesired stray light or may badly affect a parts release from a mold in the process of injection molding.

Figure 14A:
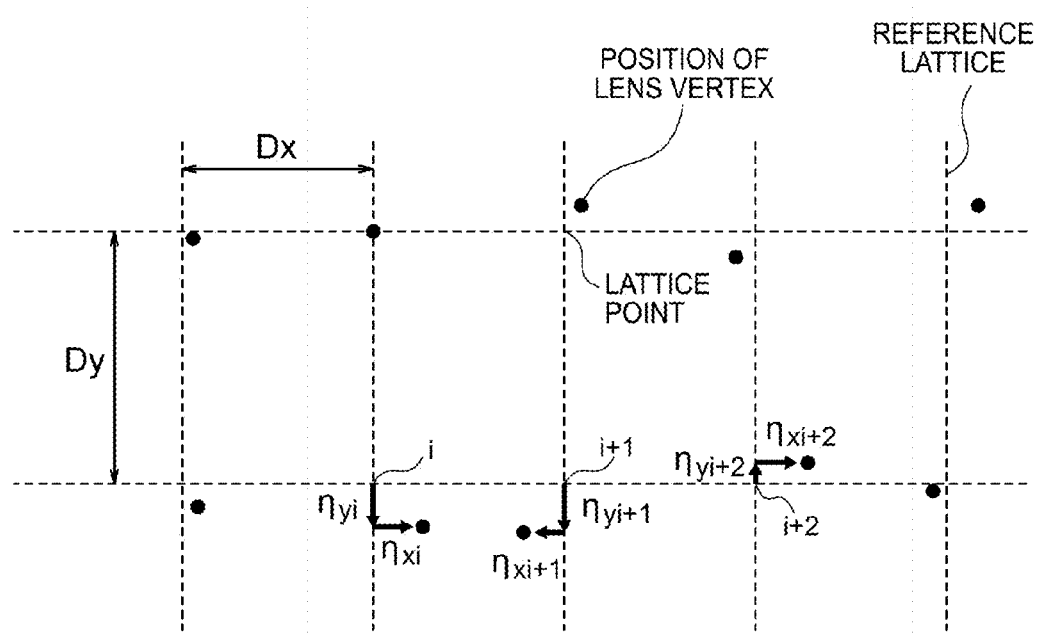
FIG. 14A shows a state in which at first vertices of plural microlenses are fixed at lattice points of the reference lattice that is a rectangular lattice, and then the vertices of plural microlenses are displaced from the lattice points in the lattice plane.

FIG. 14A shows a state in which at first vertices of plural microlenses are fixed at lattice points of the reference lattice that is a rectangular lattice, values of whose lattice spacing are Dx and Dy, and then the vertices of plural microlenses are displaced from the lattice points in the lattice plane. In FIG. 14A, an amount of displacement of a lens vertex i corresponding to a lattice point i in the x direction is respectively as ηxi and that in the y direction is represented respectively as ηyi. In this case, a projection onto the x-y plane of a boundary between adjacent microlenses is the perpendicular bisector of the line connecting projections onto the x-y plane of the two vertices of the adjacent microlenses, and no step is generated at the boundary between the adjacent microlenses surfaces if the microlenses are axisymmetric. If the microlenses are not axisymmetric, a displacement from the perpendicular bisector is generated. However, an amount of the displacement is negligible provided that ηxi and ηyi are sufficiently small in comparison with lattice spacing Dx or Dy. A boundary between microlenses is referred to as a side. In the case of a reference lattice that is a rectangular lattice, a distance between two sides facing each other is approximately equal to Dx or Dy.

In this case, letting $\eta_i$, $\eta_{i+1}$ ... represent a displacement in a lattice direction of the microlens array, letting "i" represent an integer that identifies each lattice point and the lens vertex corresponding to the lattice point, letting εi represents a deviation of a distance from the projection onto the x-y plane of the lens vertex i to the projection onto the x-y plane of the boundary between the lens vertex i and the lens vertex i+1, and letting N represent the number of microlenses arranged in the lattice direction, the following relationships hold.

$$\varepsilon_i \cong \frac{\eta_{i+1} - \eta_i}{2}$$

$$\sigma_\eta = \sum_{i=1}^{N} \frac{(\eta_i - \bar{\eta})^2}{N} = \sqrt{2}\,\sigma$$

$$\bar{\eta} = \sum_{i=1}^{N} \frac{\eta_i}{N}$$

Accordingly, it can be understood that if a variance $\sigma_n$ of displacement of lens vertex is made the square root of 2 times as great as the required variance of displacement of aperture, an appropriate variance of displacement of aperture can be obtained.

Figure 14B:
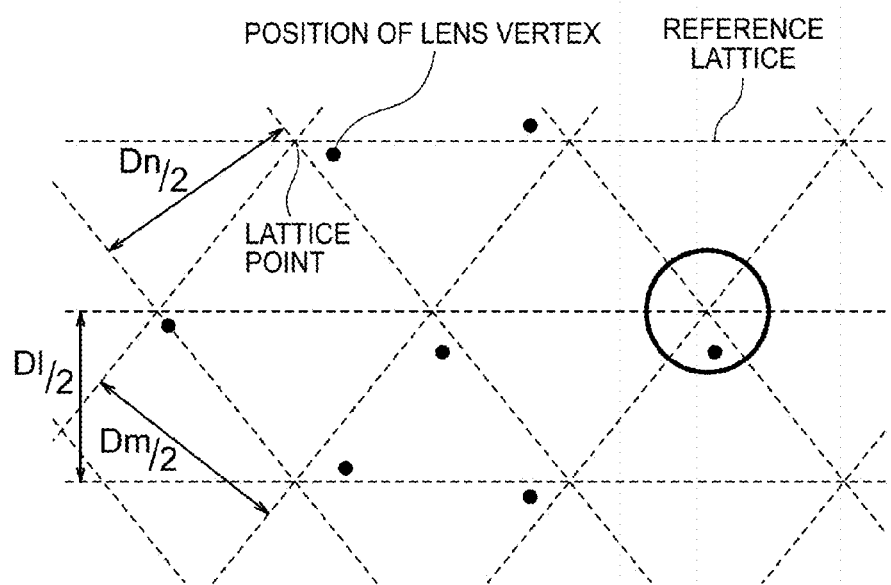
FIG. 14B shows a state in which at first vertices of plural microlenses are fixed at lattice points of the reference lattice that is a rectangular lattice, and then the vertices of plural microlenses are displaced from the lattice points in the lattice plane.

FIG. 14B shows a state in which at first vertices of plural microlenses are fixed at lattice points of the reference lattice that is a hexagonal lattice, and then the vertices of the plural microlenses are displaced from the lattice points in the lattice plane. When the lattice directions are represented as 1, m and n, the three values of the lattice spacing can be represented as Dl, Dm and Dn. In this case, a distance between two sides facing each other is approximately equal to Dl, Dm or Dn.

Figure 14C:
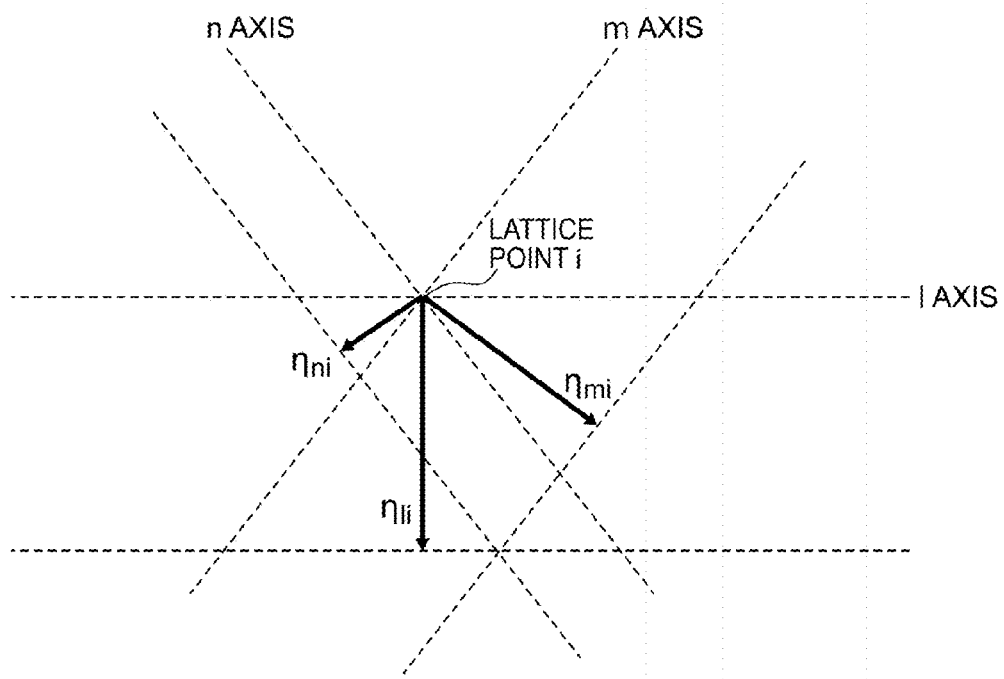
FIG. 14C is an enlarged view of the circled portion in FIG. 14B.

FIG. 14C is an enlarged view of the circled portion in FIG. 14B. In FIG. 14C, an amount of displacement of a lens vertex i corresponding to a lattice point in the 1 direction, that in the m direction and that in the n direction are represented respectively as ηli, ηmi and ηni.

The shape of a microlens surface may be a so-called free-form surface. In this case, an amount of variance of aperture can be determined by calculating a curvature of a microlens profile in each reference direction of arrangement in which lenses are periodically arranged.

Even if unevenness in intensity distribution due to diffraction at the aperture of a microlens is cancelled, unevenness in intensity distribution due to interference caused by the periodic structure of a microlens array will remain. In the case that the microlens vertices are displaced from the lattice points of the reference lattice in the lattice plane, the periodic structure itself of the microlens array is disturbed, and therefore unevenness in intensity distribution caused by the periodic structure is reduced. However, the displacement in the lattice plane alone does not effectively alert the shape of a peak of interference of diffused light, and consequently a dark spot with a very low intensity might be generated around 0 degree. In order to weaken such a dark spot, it is effective to shift phases of lights from plural microlenses by displacing the vertices of plural microlenses with respect to one another also in the optical axis direction, that is, in the direction that is perpendicular to the lattice plane.

As to the displacement of the vertices in the optical axis direction, further description is given below.

Figure 19A:
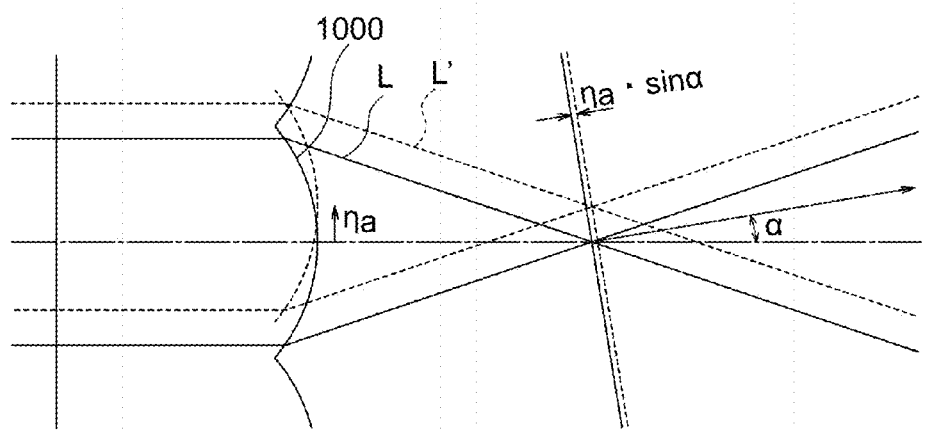
FIG. 19A shows the case that the vertex of a microlens is displaced in the direction of arrangement of the lattice.

FIG. 19A shows the case that the vertex of a microlens is displaced in the direction of arrangement of the lattice, that is, in the direction parallel to the lattice plane. In FIG. 19A, optical paths of light rays before the displacement are represented by solid lines and marked with L, and optical paths of light rays after the displacement are represented by dashed lines and marked with L'.

As shown in FIG. 19A, when the vertex of a microlens 1000 is displaced by $\eta_a$ in the direction parallel to the lattice plane, an amount of change due to the displacement in the optical path length of the plane wave component of light that has passed the microlens, the plane wave travelling in the direction that is inclined at angle α from the direction perpendicular to the lattice plane, is $\eta_a$ sin α. In this case, letting λ represent wavelength of the light, an amount of change in phase is represented by $2\pi\eta_a\cdot\sin\alpha/\lambda$. In an area where a is small, the relationship $\eta_a\cdot\sin\alpha/\lambda \ll 1$ holds, and therefore the amount of change in phase is so small that unevenness due to interference caused by the periodic structure of the microlens array cannot be eliminated to a sufficient extent.

Figure 19B:
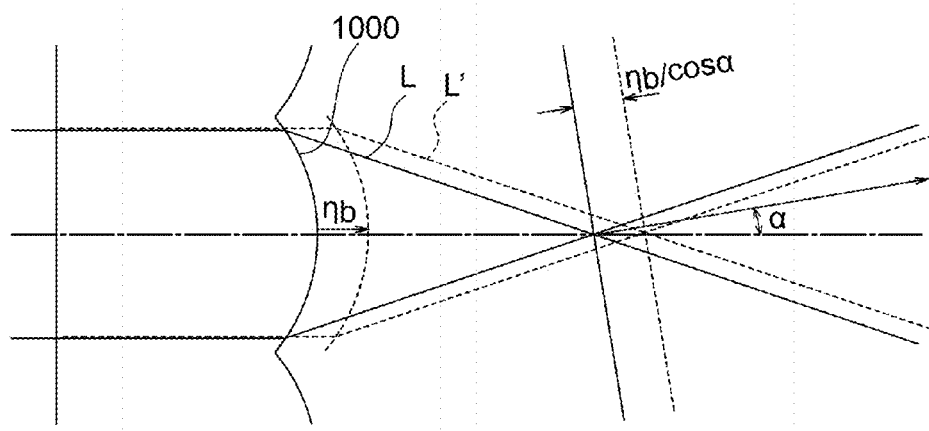
FIG. 19B shows the case that the vertex of a microlens is displaced in the direction perpendicular to the lattice plane.

FIG. 19B shows the case that the vertex of a microlens is displaced in the direction perpendicular to the lattice plane. In FIG. 19B, optical paths of light rays before the displacement are represented by solid lines and marked with L, and optical paths of light rays after the displacement are represented by dashed lines and marked with L'.

As shown in FIG. 19B, when the vertex of a microlens 1000 is displaced by $\eta_b$ in the direction perpendicular to the lattice plane, the optical path length in front of the microlens surface increases by $\pi\eta_b$, the optical path length behind the focal point decreases by $\eta_b/\cos\alpha$, and therefore an amount of change in phase is $2\pi\eta_b(n-1/\cos\alpha)/\lambda$. In an area of α (radian)$\ll 1$ where the amount of change in phase is small when the vertex of the microlens is displaced in the direction parallel to the lattice plane, the amount of change in phase is approximately $2\pi\eta_b(n-1)/\lambda$ and thus great enough to eliminate unevenness due to interference caused by the periodic structure of the microlens array to a sufficient extent when the vertex is displaced by $\eta_b$ in the direction perpendicular to the lattice plane.

In order to cancel unevenness in intensity distribution due to interference, it is desirable that phase shifts are uniformly distributed in a range of $2\pi$. For a uniform distribution of phase shifts for a light source of wavelength λ, values of displacement $\eta_z$ of microlenses in the optical axis direction should be uniformly distributed in $0 \leq \eta_{zi} < m\lambda/(n-1)$, where m is an integer that is 1 or more. For the manufacturing process and the control of light, a smaller amount of $\eta_z$ is advantageous, and therefore it is desirable that the values are uniformly distributed in $0 \leq \eta_{xi} < \lambda/(n-1)$.

Examples of the present invention will be described below.

Example 1

As shown in FIG. 1, Example 1 is a microlens array in which spherical microlens surfaces are arranged according to a square lattice as the reference lattice. Specifications of the microlens array of Example 1 are given below.

Curvature radius at the center of a microlens surface: 0.095 mm
Lattice spacing D of the reference lattice: 0.082 mm
Element thickness: 1.0 mm
Refractive index of a material (acrylic): 1.492

The element thickness of a microlens means a distance between the vertex and the bottom.

When the two orthogonal directions of the square lattice are designated as x direction and y direction, the lens vertices of microlenses are uniformly distributed in the range of ±7.6 μm in the x direction and in the range of ±7.6 μm in the y direction with respect to the reference lattice points.

In this case, the relationship $D^2/2f=0.0174$ holds, and therefore Expressions (21) and (23) are satisfied. Further, the relationships $$\sigma=0.0076/\sqrt{6}=0.031 \text{ mm}$$

and $$\frac{\sigma}{\sqrt{f}\{1+(D/2f)^2\}} = 0.0068$$

hold, and therefore Expressions (8) and (9) are satisfied.

Figure 15:
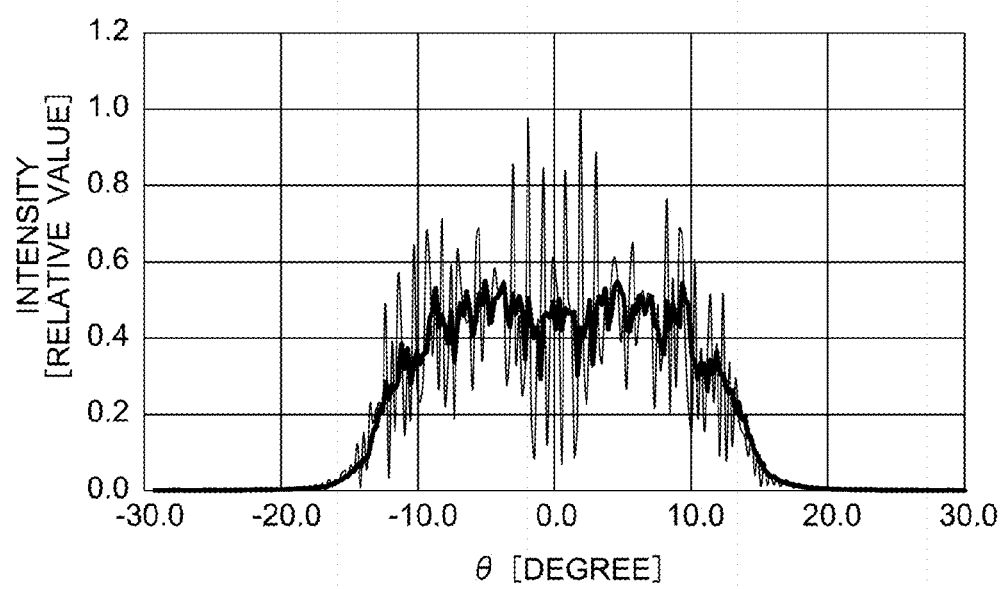
FIG. 15 shows a light intensity distribution obtained when a light beam of wavelength of 0.5876 micrometers is normally incident onto the bottom of the microlens array of Example 1 and is diverged.

FIG. 15 shows a light intensity distribution obtained when a light beam of wavelength of 0.5876 micrometers is normally incident onto the bottom of the microlens array of Example 1 and is diverged. The horizontal axis of FIG. 15 represents angle θ of divergence, and the vertical axis of FIG. 15 represents relative value of intensity of light. The unit of angle θ is degree. In FIG. 15, the thin line represents intensity of light, and the heavy line represents a one-degree moving average of intensity of light.

When the intensity distribution represented by the heavy line in FIG. 15 is compared with the intensity distribution represented by the heavy line in FIG. 3A, the portion marked with a in FIG. 3A, where a great intensity difference is generated is not present in FIG. 15. Accordingly, an illuminance distribution that is more uniform than that obtained by a conventional microlens array is obtained by the microlens array of Example 1.

Example 2

Figure 16:
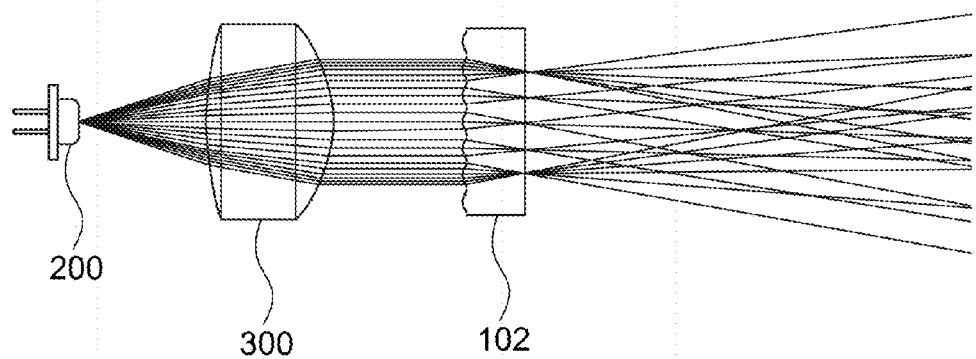
FIG. 16 shows a layout of the optical system of Example 2.

FIG. 16 shows a layout of the optical system of Example 2. The optical system of Example 2 includes a laser diode light source 200, a collimator lens 300, and a microlens array 102. The wavelength of laser of the laser diode light source 200 is 780 nanometers.

The collimator lens 300 is an aspheric lens whose material is BK7. The entry surface and exit surface can be expressed by the following expressions when the straight line connecting the center of curvature of the entry surface and that of the exit surface is designated as z axis and distance from z axis is represented by r.

$$z = \frac{cr^2}{1+\sqrt{1-(1+k)c^2r^2}}$$

$$c = \frac{1}{R}$$

The parameters of the entry surface are below.

$R=2.462$ mm, $k=-1$

The parameters of the exit surface are below.

$R=-0.979$ mm, $k=-1$

The other specification data of the collimator lens 300 are below.
  Distance from the light source to the entry surface: 1.0 mm
  Element thickness: 1.0 mm
  Refractive index of the material: 1.511
The element thickness means the center thickness of the collimator lens 300.

In the microlens array 102, microlens surfaces that are free-form surfaces are arranged according to a square lattice that is used as the reference lattice.

When the straight line that passes through the lens vertex and is perpendicular to the bottom of the microlens array 102 is designated as z axis, and in a plane perpendicular to z axis the two directions of the square lattice are designated as x axis and y axis, a microlens surface can be expressed by the following expression.

$$z = \frac{cr^2}{1+\sqrt{1-(1+k)c^2r^2}} + \sum_n\sum_m \alpha_{nm}x^n y^m$$

In the expression r represents distance from z axis.

$r=\sqrt{x^2+y^2}$

"c" represents curvature at the center of the axisymmetric term. The curvature radius at the center Rx in the x axis direction and the curvature radius at the center Ry in the y axis direction can be expressed by the following expressions, considering the second-order coefficients.

$c+2\alpha_{20}=1/R_x$ $c+2\alpha_{02}=1/R_y$

The coefficients defining the free-form surface are below.

$1/c=0, k=0$ $\alpha_{20}=2.0, \alpha_{0,2}=1.5$

The other coefficients $\alpha_{nm}$ are zero.
Considering the second-order coefficients, the curvature radius at the center of the microlens surface in the x axis direction differs from that in the y axis direction as shown below.
  Rx: 0.25 mm
  Ry: 0.33 mm
  The other specification data of the microlens array 102 are below.
  Lattice spacing D of the reference lattice: 0.2 mm
  Element thickness: 0.5 mm
  Refractive index of a material (acrylic): 1.486 (λ=780 nm or 0.78 μm)
The element thickness of a microlens means a distance between the vertex and the bottom.

The lens vertices of microlenses are uniformly distributed in ellipses, each of which has the center at one of the reference lattice points, the radius of 13.3 μm in the x direction and the radius of 15.0 μm in the y direction.

In this case, letting fx represent the focal length in the xz plane and letting fy represent the focal length in the yz plane, the relationships $D^2/(2fx\lambda)=0.056$ and $D^2/(2fy\lambda)=0.044$ hold, and therefore Expression (20) is satisfied. Further, the relationships $$\sigma_x = 0.00133/\sqrt{8} = 0.0047 \text{ mm}$$

and $$\frac{\sigma_x}{\sqrt{\lambda f_x}\{1+(D/2f_x)^2\}} = 0.0077$$

hold, and therefore Expression (7) is satisfied. Further, the relationships $$\sigma_y = 0.0053 \text{ mm}$$

and $$\frac{\sigma_y}{\sqrt{\lambda f_y}\{1+(D/2f_y)^2\}} = 0.0077$$

hold, and therefore Expression (7) is satisfied.

Figure 17A:
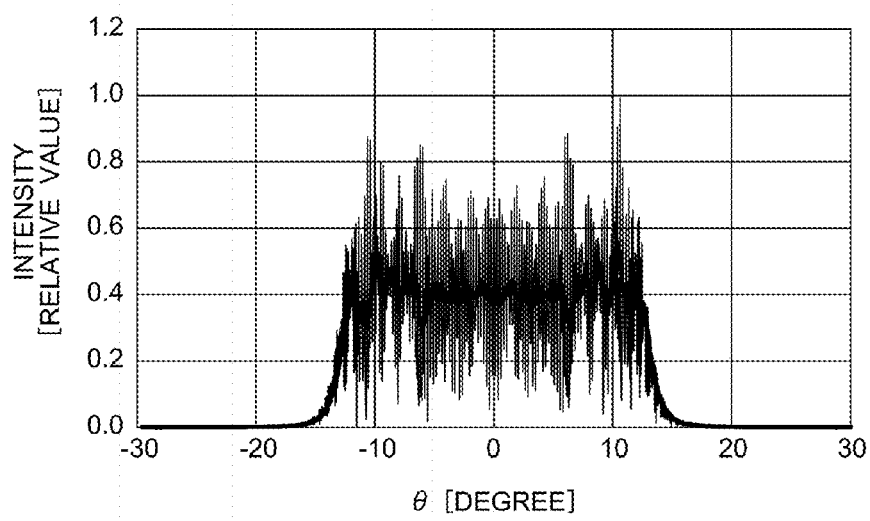
FIG. 17A shows a light intensity distribution in the x axis direction (the horizontal direction) obtained by the optical system of Example 2.

FIG. 17A shows a light intensity distribution in the x axis direction (the horizontal direction) obtained by the optical system of Example 2. The horizontal axis of FIG. 17A represents angle θ of divergence, and the vertical axis of FIG. 17A represents relative value of intensity of light. The unit of angle θ is degree. In FIG. 17A, the thin line represents intensity of light, and the heavy line represents a one-degree moving average of intensity of light.

Figure 17B:
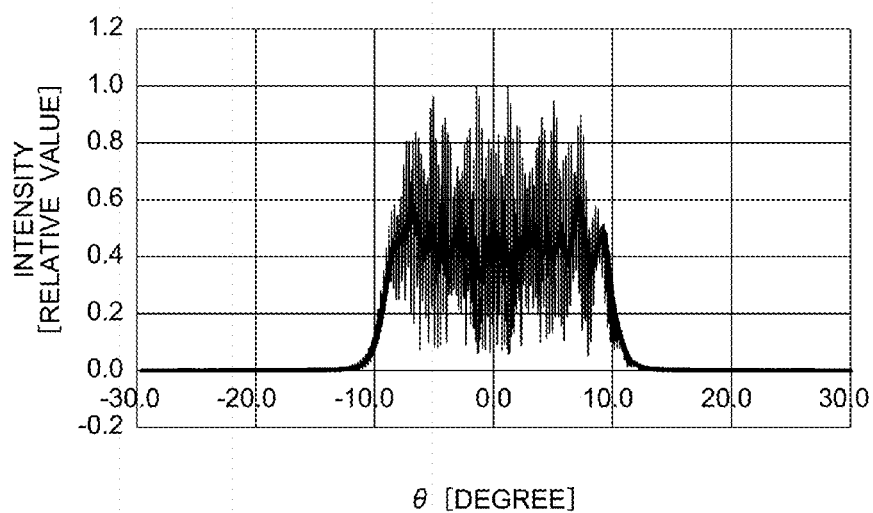
FIG. 17B shows a light intensity distribution in the y axis direction (the vertical direction) obtained by the optical system of Example 2.

FIG. 17B shows a light intensity distribution in the y axis direction (the vertical direction) obtained by the optical system of Example 2. The horizontal axis of FIG. 17B represents angle θ of divergence, and the vertical axis of FIG. 17B represents relative value of intensity of light. The unit of angle θ is degree. In FIG. 17B, the thin line represents intensity of light, and the heavy line represents a one-degree moving average of intensity of light.

When the intensity distributions represented by the heavy lines in FIGS. 17A and 17B are compared with the intensity distribution represented by the heavy line in FIG. 3A, the portion marked with a in FIG. 3A, where a great intensity difference is generated is not present in FIGS. 17A and 17B. Accordingly, illuminance distribution that are more uniform than that obtained by a conventional microlens array is obtained by the microlens array of Example 2.

Example 3

Figure 18A:
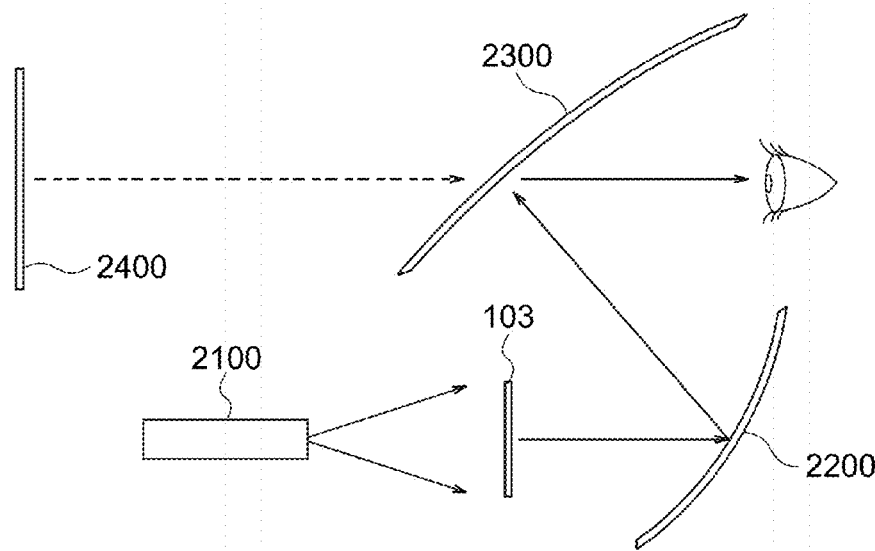
FIG. 18A shows a layout of the optical system of Example 3.

FIG. 18A shows a layout of the optical system of Example 3. The optical system of Example 3 includes a light source optical system 2100, a screen 103 that is a microlens array, a free-form surface mirror 2200, and a wind-screen 2300.

Figure 18B:
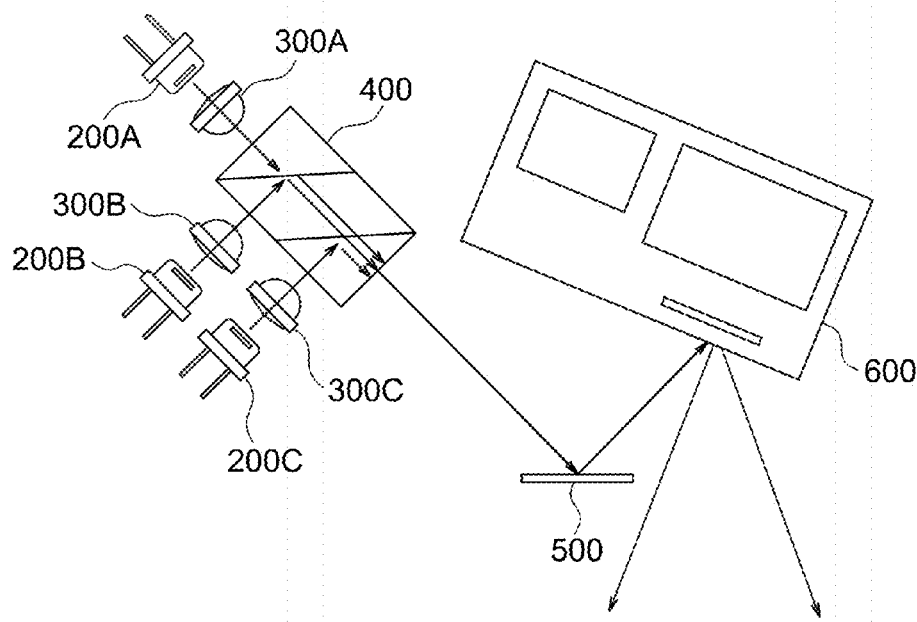
FIG. 18B shows a layout of the light source optical system.

FIG. 18B shows a layout of the light source optical system 2100. The light source optical system 2100 includes laser diodes 200A, 200B and 200C, collimator lenses 300A, 300B and 300C, a dichroic mirror 400, a mirror 500 and a MEMS mirror 600.

The optical system of Example 3 is a head-up display using lasers 200A, 200B and 200C that have three different emission wavelengths, 0.45 μm, 0.53 μm and 0.65 μm as light sources. The lights emitted by the three laser diodes 200A, 200B and 200C are collimated respectively by collimator lenses 300A, 300B and 300C and then are multiplexed by the dichroic mirror 400 to form a single beam. The multiplexed beam is deflected by the MEMS mirror 600 to scan the microlens array 103. The laser diodes 200A, 200B and 200C are modulated in synchronization with the MEMS mirror 600 such that an intermediate image is rendered on the microlens array 103. After angle of divergence for the intermediate image is enlarged by the microlens array 103, lights are reflected by the free-form surface mirror 2200 and the wind-screen 2300 to form a virtual image 2400. If there exists unevenness of intensity of light diverged by the microlens array 103, it is disadvantageous that unevenness is generated also in the virtual image, and brightness of the virtual image varies due to a change in the location of the eye point.

The microlens array 103 used as a screen is a microlens array for which a rectangular lattice with Dx=0.1 mm and Dy=0.05 mm is used as the reference lattice. The positions of plural microlens lens vertices are uniformly distributed in ellipses each of which is set around one of the reference lattice points and has the radius of 12.3 μm in the x axis direction and the radius of 12.8 μm in the y axis direction, and are uniformly distributed in the z axis direction in the range up to 2.65 11M.

The microlens surface is an axisymmetric and an aspheric surface and can be expressed by the following expressions when the straight line that passes through the lens vertex and is perpendicular to the bottom is designated as z axis, and distance from z axis is represented by r.

$$z = \frac{cr^2}{1+\sqrt{1-(1+k)c^2r^2}}$$

$$c = 1/R$$

The parameters of each microlens surface are below.
Curvature radius at the center of the lens surface: 0.1 mm
Conic constant k: −1.0
The other specification data of the microlens array 103 are below.
Element thickness: 1.0 mm
Refractive index of a material (acrylic): 1.492
In this case, the relationships $$Dx^2/2f/0.45=0.055$$

$$Dx^2/2f/0.53=0.046$$

$$Dx^2/2f/0.65=0.038$$

$$Dy^2/2f/0.45=0.055$$

$$Dy^2/2f/0.53=0.046$$

$$Dy^2/2f/0.65=0.038$$

hold, and each of them satisfies Expression (20).
Further, the relationships $$ox=0.00435 \text{ mm and}$$

$$oy=0.00417 \text{ mm}$$

hold, and therefore the relationships $$\frac{\sigma_x}{\sqrt{0.53 \cdot f}\{1+(D_x/2f)^2\}} = 0.0125$$

and $$\frac{\sigma_y}{\sqrt{0.53 \cdot f}\{1+(D_y/2f)^2\}} = 0.0125$$

hold. Thus, Expressions (7), (9) and (11) are satisfied for λ=0.53 micrometers. Further, Expressions (7) is satisfied for λ=0.45 micrometers and λ=0.65 micrometers.
Further, the relationships $$2.66=0.45\times5+0.41$$

$$2.66=0.53\times5+0.01$$

$$2.66=0.65\times4+0.06$$

hold, and the reminders obtained when 2.66 is divided by the values of wavelength are 0.41, 0.01 and 0.06. Thus, the following relationships are satisfied.

0.41/0.45>0.9

0.01/0.53<0.1

0.06/0.65<0.1

In summary, the vertex positions of plural microlenses are uniformly distributed in the direction perpendicular to the lattice plane in the range from 0 to 2.66 micrometers, and thus for each of the three wavelengths, phases of lights from the plural microlenses are displaced from one another so that a so-called dark spot can be weaken.

In the head-up display of Example 3, unevenness of intensity distribution of light diverged by the microlens array is small, and unevenness of brightness in the virtual image is reduced.

What is claimed is:

1. A microlens array including N microlenses arranged in at least one direction on an x-y plane, wherein a projection onto the x-y plane of the lens vertex of each microlens is arranged on or near a lattice point of a reference lattice on the x-y plane, the lattice spacing of the reference lattice in the at least one direction being D (millimeters), and when a boundary between two microlenses adjacent in the at least one direction is referred to as a side of a lens, a projection onto the x-y plane of the side is located approximately at the middle of projections onto the x-y plane of the vertexes of the two microlenses and therefore a distance between two sides facing each other and spaced in the at least one direction is approximately equal to D, and wherein a distance between a projection onto the x-y plane of a lens vertex i and a projection onto the x-y plane of a side between the lens vertex i and a lens vertex i+1 is $D/2 + \varepsilon_i$ where $\varepsilon_i$ represents a dispersion of the distance from D/2 and for the N microlenses, $$\sigma^2 = \sum_{i=1}^{N} \frac{(\varepsilon_i - \bar{\varepsilon})^2}{N}$$

$$\bar{\varepsilon} = \sum_{i=1}^{N} \frac{\varepsilon_i}{N} = 0,$$

and where $\sigma^2$ represents variance of $\varepsilon_i$ and letting n represent the refractive index of the material of each microlens, letting R (millimeters) represent the curvature radius in the at least one direction at the center of each microlens and letting f (millimeters) represent the focal length of each microlens, the relationships $$\frac{0.0042}{D} < \frac{D}{2f} = \frac{D(n-1)}{2R}$$

$$0.0048\sqrt{f}\{1+(D/2f)^2\} < \sigma < 0.014\sqrt{f}\{1+(D/2f)^2\}$$

are satisfied.

2. A microlens array according to claim 1, wherein in the x-y plane, a boundary between the lens vertex i and the lens vertex i+1, which are adjacent to each other in the at least one direction, is the perpendicular bisector of the line connecting the lens vertex i and the lens vertex i+1, or an amount of displacement of the boundary from the perpendicular bisector is negligible.

3. A microlens array according to claim 1, wherein the reference lattice is rectangular or hexagonal.

4. A microlens array according to claim 1, wherein a projection onto the x-y plane of the vertex of each microlens is displaced by $\eta_i$ in the at least one direction from the corresponding lattice point so as to generate $\varepsilon i$, $\eta_i$ representing a dispersion of a position of the vertex of each micro lens with respect to the corresponding lattice point.

5. A microlens array according to claim 4, wherein the at least one direction includes x and y directions, the reference lattice on the x-y plane is rectangular, the lattice spacing D in the x direction being represented by Dx and the lattice spacing D in the y direction being represented by Dy, and a projection onto the x-y plane of the vertex of each microlens is displaced by $(\eta_{xi}, \eta_{yi})$ from the corresponding lattice point where $\eta_{xi}$ represents $\eta_i$ in the x direction and $\eta_{yi}$ represents $\eta_i$ in the y direction.

6. A microlens array according to claim 1, wherein the at least one direction includes x and y directions, the reference lattice on the x-y plane is rectangular in the x and y directions, and in the vicinity of the center of each of the microlenses, the curvature radius in the x direction is Rx (millimeters) and the curvature radius in the y direction is Ry (millimeters).

7. A microlens array according to claim 1, wherein the relationship $$\frac{0.047}{D} < \frac{D}{2f} = \frac{D(n-1)}{2R}$$

is further satisfied.

8. A microlens array according to claim 1, wherein the relationship $0.0064\sqrt{f}\{1+(D/2f)^2\} < \sigma < 0.014\sqrt{f}\{1+(D/2f)^2\}$ is further satisfied.

9. A microlens array according to claim 1, wherein the vertex positions of plural microlenses are displaced with respect to one another in the direction that is perpendicular to the x-y plane so as to weaken a dark spot.

10. A microlens array according to claim 1, wherein when the maximum value of the absolute value of $\varepsilon_i$ is represented by $|\varepsilon_i|_{max}$ and a standard deviation of $\varepsilon_i$ is represented by $\sigma$, the relationship $|\varepsilon_i|_{max} < 3\sigma$ is satisfied.

11. An optical system including a light source emitting lights of the wavelength of $\lambda$ (micrometers), and a microlens array configured to diverge the lights from the light source, wherein the microlens array includes N microlenses arranged in a at least one direction on an x-y plane, a projection onto the x-y plane of the lens vertex of each microlens is arranged on or near a lattice point of a reference lattice on the x-y plane, the lattice spacing of the reference lattice in the at least one direction being D (millimeters), and when a boundary between microlenses is referred to as a side of a lens, a projection onto the x-y plane of the side is located approximately at the middle of projections onto the x-y plane of the vertexes of the two microlenses and therefore a distance between two sides facing each other and spaced in the at least on direction is approximately equal to D, and wherein a distance between a projection onto the x-y plane of a lens vertex i and a projection onto the x-y plane of a side between the lens vertex i and a lens vertex i+1 is $$D/2+\varepsilon_i$$

where $\varepsilon_i$ represents a dispersion of the distance from D/2 and for the N microlenses, $$\sigma^2 = \sum_{i=1}^{N} \frac{(\varepsilon_i - \bar{\varepsilon})^2}{N}$$

$$\bar{\varepsilon} = \sum_{i=1}^{N} \frac{\varepsilon_i}{N} = 0,$$

where $\sigma^2$ represents variance of $\varepsilon_i$ and letting n represent the refractive index of the material of each microlens, letting R (millimeters) represent the curvature radius in the at least one direction at the center of each microlens and letting f (millimeters) represent the focal length of each microlens, the relationships $$\frac{0.0072\lambda}{D} < \frac{D}{2f} = \frac{D(n-1)}{2R}$$

$$0.0062\sqrt{\lambda f}\{1+(D/2f)^2\} < \sigma < 0.019\sqrt{\lambda f}\{1+(D/2f)^2\}$$

are satisfied.

12. An optical system according to claim 11, wherein in the x-y plane, a boundary between the lens vertex i and the lens vertex i+1, which are adjacent to each other in the at least one direction, is the perpendicular bisector of the line connecting the lens vertex i and the lens vertex i+1, or an amount of displacement of the boundary from the perpendicular bisector is negligible.

13. An optical system according to claim 11, wherein in the microlenses of the microlens array, the relationship $$\frac{0.047}{D} < \frac{D}{2f} = \frac{D(n-1)}{2R}$$

is further satisfied.

14. An optical system according to claim 11, wherein in the microlenses of the microlens array, the relationship $$0.0083\sqrt{\lambda f}\{1+(D/2f)^2\} < \sigma < 0.019\sqrt{\lambda f}\{1+(D/2f)^2\}$$

is further satisfied.

15. An optical system according to claim 11, wherein the vertex positions of plural microlenses are displaced with respect to one another in the direction that is perpendicular to the x-y plane so as to weaken a dark spot.

* * * * *